United States Patent [19]

Grubb et al.

[11] Patent Number: 5,272,623
[45] Date of Patent: Dec. 21, 1993

[54] SOFTWARE PROGRAMMING METHOD FOR FORMING GOVERNMENT CONTRACTING DOCUMENTS

[75] Inventors: Don R. Grubb, Damascus; Clifford Gordon, Bladensburg, both of Md.; Neal Crowley, Arlington, Va.

[73] Assignee: The United States of America as represented by the Secretary of the Navy, Washington, D.C.

[21] Appl. No.: 610,193

[22] Filed: Nov. 7, 1990

[51] Int. Cl.$^5$ .............................................. G06F 15/00
[52] U.S. Cl. .................................... 364/401; 364/406; 364/408
[58] Field of Search ....................... 364/401, 406, 408

[56] References Cited

U.S. PATENT DOCUMENTS

| | | | |
|---|---|---|---|
| 4,346,442 | 8/1982 | Musmanno | 364/408 |
| 4,752,877 | 1/1988 | Roberts et al. | 364/408 |
| 4,800,845 | 1/1989 | Ackroff et al. | 364/200 |
| 4,831,526 | 5/1989 | Luchs et al. | 364/401 |
| 4,876,648 | 10/1989 | Lloyd | 364/408 |

Primary Examiner—Donald E. McElheny, Jr.
Assistant Examiner—Gita D. Shingala
Attorney, Agent, or Firm—Elmer E. Goshorn

[57] ABSTRACT

An improved method for executing a computer system novel software (SW) program along with an enhanced series of five different data base logic tables that produce one or more tailored contracting documents (CDs) each with correctly selected Government Agency Regulation clauses (GARCs). In carrying out the method and producing any tailored CD, a multiline item (M/LI) multi-data field (M/DF) configuration table (CT) is formed when a user provides input data as well as from the data base selects categories and selectively answers questions. Then a M/LI M/DF logic test table (LTT) enables logic analysis either by itself as to any line item or in conjunction with a CT or a M/LI M/DF logic test results table (LTRT) all during a SW cycle (SWC). The SWC also permits analysis of certain test results of the LTRT prior to the LTRT coordinating with a logic test name table (LTNT) so as to enable formation of a M/LI M/DF pattern table (PT) having alpha-numeric identification of one or more correctly selected GARCs. In order to assure accurate correlation of a CT, a LTRT and a PT, a common docket group number is assigned thereto for logging-in and positively identifying any CD being produced. Since the LTT and LTNT both have all possible logic names therein, any tailored CD can be produced by the improved method with correctly selected GARCs therein full text or otherwise as well as with each selected GARC being inserted at a predetermined CD section.

33 Claims, 9 Drawing Sheets

SOFTWARE PROGRAMMING METHOD FOR FORMING GOVERNMENT CONTRACTING DOCUMENTS

This invention concerns an improved method for generating a tailored contracting document in response to user input data; and, more particularly, it concerns an improved method for generating one or more tailored contracting documents where each document is in response to a user input and where the method is carried out in relation to a data base having an enhanced arrangement of multi-data field logic tables as well as having Government Agency Regulation clauses (GARCs) for any contracting document to be produced and where the method has a series of unique software programming steps for progressively forming each document such that any formed document is provided with its correct selection of GARCs full text or otherwise and with any selected GARC being incorporated at a desired section of any formed document.

BACKGROUND OF THE INVENTION

In the past, methods involving software programs have been developed for generating various types of different documents. For exzample, U.S. Pat. No. 4,800,485 to J. M. Ackroff et al concerns an on-line documentation facility for use in a computer system having one or more user stations where any on-line documentation at any user station is subject to user modification as desired. U.S. Pat. No. 4,831,526 to C. M. Luchs et al discloses a computerized insurance premium quote request and policy issuance system of a multi-terminal network configuration for auto or property insurance where each policy as issued is tailored to the customer's (client's) request after both underwriter and customer approval. The system is generally made up of an interactive data storage bank for not only receiving input data from any terminal but also maintains an updated full text storage of appropriate clauses and applicable government regulations. U.S. Pat. No. 4,876,648 to C. B. Lloyd concerns an inter-network multiterminal computer system for forming a mortgage tailored to each customer's plan for purchasing a residential property. The system involves both investment funding and insurance thereby meeting customer needs for collateralizing a property being purchased by the customer in order to obtain a loan and secure the debt payment relative thereto. However, none of the aforementioned patents were concerned with the improved software programming method of the instant invention for enabling the production of one or more tailored but different Government contracting documents by use of a unique menu-driven, option selection software program along with an enhanced data base of Government Agency Regulation clauses (GARCs) and a series of different logic tables. The improved software programming method in carrying out the steps the program in conjunction with the data base for any software cycle (SWC) is useable in a multi-terminal network computer system where each contracting document in being produced is provided with its correctly selected GARCs (full text or otherwise) as well as each selected GARC is incorporated in the proper section of the document all in response to a user request at a terminal for generating a document.

SUMMARY OF THE INVENTION

An object of the present invention is to provide an improved menu-driven, option selectable software programming method in relation to an enhanced data base for uniquely operating a computer system in order to advantageously generate any tailored contracting document (CD) with correctly selected GARCs as the result of any user request.

Another object of the present invention is to provide an improved software programming method in conjunction with a novel interactive data base of GARCs and a series of logic tables some of which are predetermined and others of which are generated in relation to any Government CD being formed where the enhanced improved method enables operation of a computer system so as to advantageously generate a tailored Government CD with correctly selected GARCs and with each selected GARC being incorporated in the proper section of the CD all during a software cycle in carrying out the invention.

Still another object of the present invention is to provide an improved software programming method for interaction with a storage bank of GARCs and logic tables so as to advantageously generate a tailored CD with its correctly selected GARCs in response to a user input where the program permits the use of a log-in technique for identifying any Government CD while being produced so as to prevent loss of the CD or any misidentification thereof.

And still another object of the present invention is to provide an improved software programming method having unique steps for generating a tailored CD with its correctly selected GARCS full text or otherwise in response to a user request at a terminal where the improved method permits logic analysis for obtaining at least one test result in relation to one or more tables of the data base so as to assure formation of any CD with correctly selected GARCs as well as printing of the correctly selected GARCs full text or otherwise at desired CD sections..

In summary, the invention is an improved menu driven, option selectable software programming method for executing a for effecting operation of a computer system (CS) so as to form one or more tailored contracting documents with each document having one or more correctly selected GARCs. This method advantageously interrelates an enhanced interactive storage bank of both GARCs and a series of multi-data field (M/DF) logic tables so as to form one or more tailored contracting documents as the result of user input and logic analysis during a software cycle (SWC), where each Government contracting document (CD) as formed incorporates one or more selected GARCs (full text or otherwise) at one or more predetermined sections thereof. Some of these tables are produced during a SWC for a Government CD being formed and other tables are predetermined for use with any CD. The CD produced by the improved method can be any suitable CD, e.g., a letter contract, an amendment, an invitation for bid, etc. In carrying out the method, the SW program after user data input of a purchase request, vendor data, etc., then provides data-stored menu-displayed selectively answerable questions along with selectable categories all for enabling the CS to initially produce in the data base thereof a multi-line item (M/LI) M/DF configuration table (CT) for a CD to be produced during a SWC. The CT is generally made up of a series of four DFs, namely: a common docket group no. DF (CDGNDF) for logging-in and identifying the CD being formed, a logic question no. DF (LQNDF), a logic name DF (LNDF) and a user answer DF (UADF). The CT UADF as the result of data input and menu selection for any CD being formed specifies at any UADF LI "Y" for yes, "N" for no or some numerical amount.

A M/LI M/DF logic test table (LTT) for any CD to be produced by a CS is predetermined and permanently stored in a CS interactive storage bank. A LTT is generally made up of a series of ten DFs, namely: a logic test name DF (LTNDF); three left side DFs of a numerical subtest identification DF/left side (NSTIDF/LS), a logic selection symbol designated DF/LS (LSSDDF/LS) and a logic name DF/LS (LNDF/LS); a logic test operand identification DF (LTOIDF), two right side DFs (TRSDFs) of a LSSDDF/RS and an answer symbol designated DF/RS (ASDDF/RS) and a series of three test result DFs (TTRDFs) of a TDF for true, a FDF for false and a NDF for unknown. As will become more apparent hereinafter, the NDF always has an "END" test result but the TDF or FDF may have either an "END" test result or a specified numerical subtest test result where the subtest test result enables identification of another LTT LI for logic analysis and one or more other test results until an END test result is obtained all during a CS SWC.

A M/LI M/DF logic test results table is formed as the result of initial and complete analysis of the LTT during a SWC for forming a CD. It is generally made up of a series of three DFs, namely: a CDGNDF, a LTNDF, and a logic test result DF (LTRDF). Any LTRDF LI specifies a test result of "T" for true, "F" for false or "N" for unknown during a SWC as the result of logic analysis of one or more LTT LIs. Each LTRT test result is effected by logic analysis of a LTT LI by itself, by logic analysis of more than one LTT LI where at least one subtest test result is obtained or by logic analysis of a LTT LI in conjunction with a CT LI or a LTRT LI as required by reason of the logic specified under certain LTT DFs at a LTT LI. It is noted here when a TDF or FDF of a LTT LI specifies a subtest number test result then the next LTT LI in sequence during a CS SWC is normally identified because the next LTT LI under its NSTIDDF/LS, not only specifies the subtest number of a previously analized LTT LI but also specifies an LTN under its LTNDF that corresponds to the LTN of the previously analized LTT LI. If the logic analysis of the next LTT LI specifies another subtest test result for its TDF or FDF, then another LTT LI is analized, etc. until the test result of an analized LTT LI finally specifies a TDF, FDF or NDF with an "END" test result. Hence, when a TDF, FDF or NDF of a LTT LI specifies an "END" test result after analysis of the LTT LI during a SWC, then an entry in the next LTRT LI being formed in forming a CD will be T, F or N in accordance with the invention.

During logic analysis of any LTT LI, the LSSDDF/LS can specify a symbol "LN" for logic name, "LT" for logic test name or "TF" for true or false. If "LN", then the logic name given under the LTT LNDF/LS of a LTT LI governs and then the CT for a CD being formed is searched until a corresponding logic name is identified under the CT LNDF at a CT LI thereby determining the CT LI with the LN corresponding to the LTT LN for the current LTT LI being analized for a LTT test result during a CS SWC. At the same time, the LTOIDF of any LTT LI usually specifies "EQS" (for equals), "GTE" (for greater than equals) or "LTE" (for less than equals) while the LSSDDF/RS thereof specifies "TF" for true or false or "LS" for logic string. Also, at the same time the ASSDDF/RS of any LTT LI specifies "Y" for yes, "N" for no, "TRUE", "FALSE" or a particular numerical amount. As will become more apparent hereinafter depending on the logic parameters specified by LTT left and right side DFs for any LTT LI being analized during a SWC determines how the logic is to be utilized, e.g., whether the LTT LI logic is analized either by itself or in conjunction with logic of an identified CT LI or with the logic of an identified LTRT LI (if it exists during this part of a SWC for forming a CD) in determining a LTT LI subtest number test result or an "END" test result. Hence, by reason of the various logic parameters for any LTT LI together with user input in forming a CT as well as forming a LTRT in response to LTT analysis, a great number of logic conditions and combinations can be met during a CS SWC for correctly selecting one or more GARCs for a CD being formed as well as incorporating any selected GARC at a predetermined section in the formed CD.

A M/LI M/DF logic test name table (LTNT) is predetermined and permanently stored in the interactive storage bank. It is generally made up of a series of three DFs, namely: a LTNDF, a which contract section DF (WCSDF) for specifying the predetermined section for one or more GARCs and an alpha-numeric identification designation DF (ANIDDF) for identifying one or more GARCS with each identified GARC being associated with its respective section under the WCSDF.

After all LIs of the LTT have been analized during a SWC, then a LTRT has been completed with common docket group numbers (CDGNs) for all of its LIs for a CD being formed. As the result of this completion, the SWC then analizes, under an assigned pass number, all "N" test results under the LTRT LTRDF for correctness relative to appropriate LTT LI logic. In other words and as will become more apparent hereinafter, each LI of the LTRT having an "N" answer or test result is analized at least once during a SWC by the LTRT LTN (at a LTRT LI with the "N" answer) searching and identifying a corresponding LTT LTN thereby determining the LTT LI for conducting reanalysis of its logic (with or without a CT LI as required by LTT logic) in conjunction with the LTRT LI. When the LTRT after analysis at least once of all "N" answers therein such that when either the "N" count after any "N" analysis remains the same or the "N" count after LTRT analysis during a given pass no. is zero, then the LTRT LIs with "T" answers are correct in accordance with the invention. Then, no further LTRT analysis of "N" answers is required for a CD being produced during a SWC.

A M/LI M/DF pattern table (PT) is formed during a SWC for a CD being produced as the result of completing analysis of the LTRT as aforedescribed. It is generally made up of a series of four DFs, namely: a CDGNDF, a WCSDF for specifying the predetermined CD section for a selected GARC at any PT LI, an ANIDDF for specifying a selected GARC and an attribute multibyte flag code DF (AM/BFCDF). The AM/BFCDF by specifying the byte encoding thereof for any PT LI enables a bit of the byte for any PT LI under AM/BFCDF to determine whether or not a selected GARC is full text or otherwise for a CD being produced. After forming and analizing the LTRT as aforementioned and when a given LTRT LI has a "T" answer under the LTRTDF during a SWC, then the LTN under the LTNDF at the given LTRT LI serves as the basis for searching and identifying a corresponding LTN at a LI of the LTNT so as to enable identification from the LTNT LI which contract section is specified under the LTNT WCSDF and which GARC is specified in alpha-numeric form under the LTNT ANIDDF as the correctly selected GARC. Then, after such identification during a SWC, the specified contract section along with the selected GARC form the initial or next LI of a PT being formed until all LIs of the LTRT with a "T" answer are translated in relation to the LTNT as aforementioned for identifying not only correctly selected GARCs but also the proper contract section for each selected GARC. At the same time, an appropriate multibyte flag code reference table not shown that is permanently stored in the CS storage bank, is provided with a given LI of the LTT and corresponding LTN for the purpose of identifying ANIDDF at a LTNT LI that assists in forming an initial or subsequent PT LI including identification of a byte flag code for enabling print-out of the selected CARC full text or otherwise at a predetermined section of the CD during forming of the CD by the instant invention; all for the purpose of selecting the proper byte flag code for any PT LI being formed in relation to the selected GARC.

Other objects and advantages of the invention will become more fully apparent hereinafter when taken in conjunction with the appended specification and drawings as hereinafter described.

DETAILED DESCRIPTION OF THE INVENTION

A illustrated in Table I below, it lists a series of nine (9) representative Government contracting documents (CDs) each of which can be formed in tailored fashion with correctly selected GARCs incorporated as either full text or otherwise and with each correctly selected GARC being incorporated in one or more predetermined sections of any CD being formed.

TABLE I

| EXAMPLE OF VARIOUS CONTRACTING DOCUMENTS THAT CAN BE TAILORED AND GENERATED BY THE INVENTION IN RESPONSE TO USER INPUT |
| --- |
| 1. INVITATION FOR BID (IFB) |
| 2. REQUEST FOR PROPOSAL |
| 3. REQUEST FOR QUOTE |
| 4. LETTER CONTRACT |
| 5. CONTRACT |
| 6. AMENDMENT |
| 7. MODIFICATION |

TABLE I-continued

| EXAMPLE OF VARIOUS CONTRACTING DOCUMENTS THAT CAN BE TAILORED AND GENERATED BY THE INVENTION IN RESPONSE TO USER INPUT |
| --- |
| 8. PURCHASE ORDER |
| 9. DELIVERY ORDER |

Any CD in being formed is in response to a user input as effected by a preferred embodiment of an improved software programming method of the invention for carrying out unique steps of a novel SW program for operating a computer system (CS) in conjunction with an enhanced CS data base of both GARCs, a series of unique logic tables where some of the tables are permanent and other tables are generated in relation to any CD being formed and a permanently stored attribute multibyte flag code reference table AM/BFCRT. In order to prevent improper logic analysis in relation to any CD being formed in accordance with the invention, a common docket group number is assigned to certain logic tables as set forth more fully hereinafter. It is to be understood that the invention is not limited to the CDs as specified in Table I, but the invention could provide any suitable CD other than shown therein. Also, the improved method is capable of operating at either a single terminal CS or a multi-terminal network CS.

Figure 1:
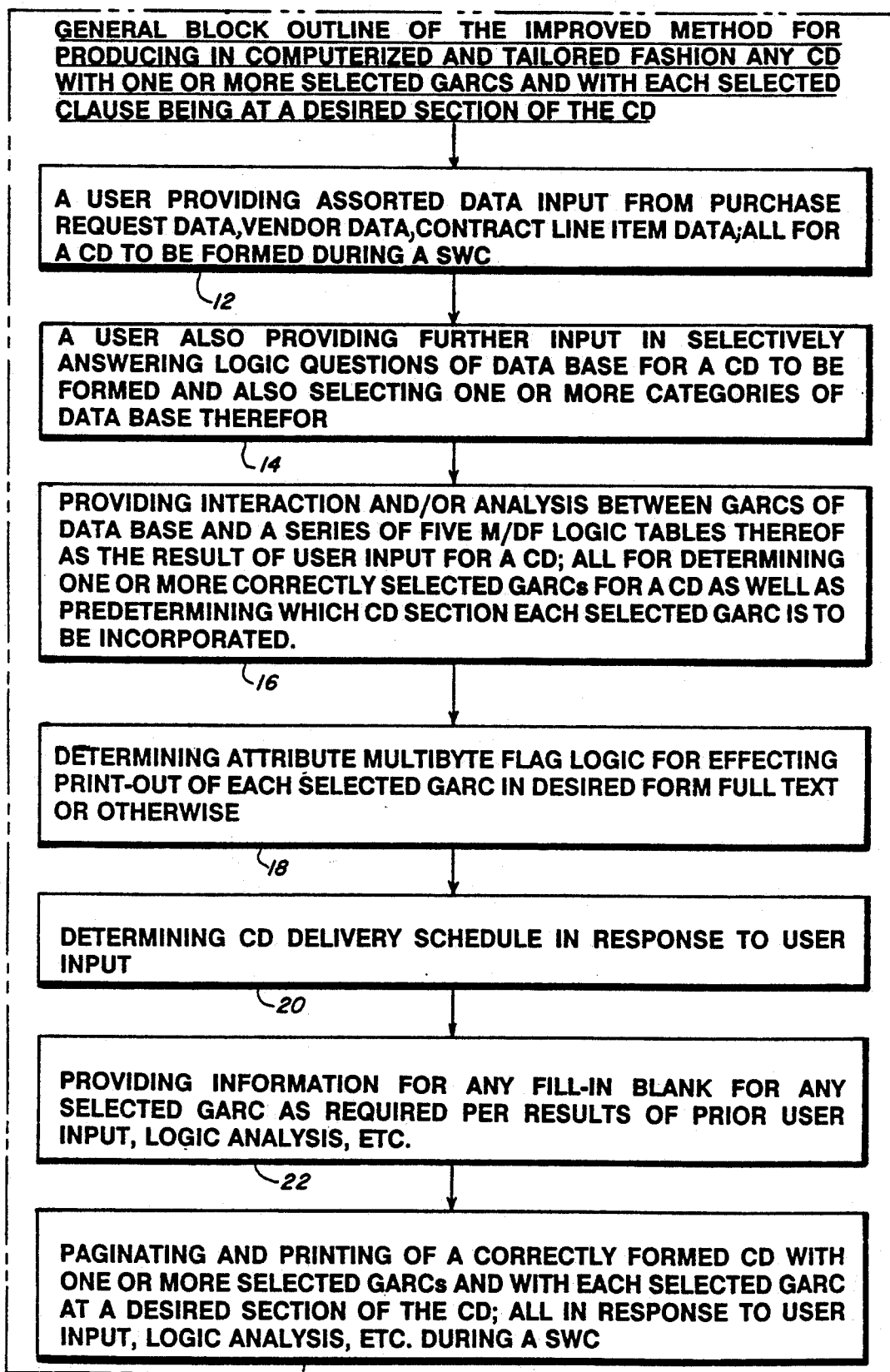
FIG. 1 is a diagrammatic view of various representative and generalized steps for enabling production of a Government CD in tailored fashion during any SWC of a computer system for the purpose of carrying out an embodiment of the improved software programming method of the invention.

With reference to FIG. 1, a table 11 specifies a series of seven general steps of the improved software programming method that are illustrated for producing a CD during any SWC. Each step of the seven steps of the series is shown in its respective block 12, 14, 16, 18, 20, 22, or 24, with all steps being for progressively causing production of a tailored Government CD in response to a user request. As indicated by the step of block 12, a user provides data input of contract line item requirements in response to purchase request data, vendor data, etc. all for initiating formation of a particular CD as the result of a customer request, e.g., where the customer is either a Government or contractor program office. Then in block 14, the user supplements his/her input with selection of one or more menu-driven categories from the CS data base followed by the user selecting "YES" answers to one or more menu-driven logic questions as depicted in Tables II and III respectively.

TABLE II

| EXAMPLES OF VARIOUS CATEGORIES TO BE SELECTED OR NONSELECTED FOR ANY CD BEING FORMED AS STORED IN THE DATA BASE |
| --- |
| Agency unique clauses |
| Acquiring agency information |
| Agency waivers and exemptions |
| Contracting methods |
| Letter contract information |
| Options |
| Government contract requirements |
| Proposed and contract award information |
| Two step bidding |
| Affirmative action waivers |
| Socio-economic and small business programs |
| Government required source requirements |
| General information |
| Additional contract type information |
| Research and development requirements |
| Research and development contracting |
| Service contracting acquisition requirements |
| ADP servive requirements |
| ADP acquisition requirements |
| ADP equipment requirements |

TABLE II-continued
EXAMPLES OF VARIOUS CATEGORIES TO BE SELECTED OR NONSELECTED FOR ANY CD BEING FORMED AS STORED IN THE DATA BASE Supply contracting

TABLE III
EXAMPLE OF A SERIES OF REPRESENTATIVE LOGIC QUESTIONS TO BE ANSWERED "Y" FOR YES IF SELECTED FOR ANY CD BEING FORMED WITH THE QUESTIONS BEING STORED IN THE DATA BASE

1. Is the procurement for facilities?
2. Does the procurement involve consolidated facilities?
3. Does the procurement involve facilities acquisition?
4. Does the procurement involve the use of facilities?
5. Has a warranty clause been approved under agency?
6. Is the procurement subject to qualification requirements?
7. Does the Government require specified warranty protection?
8. Will the recovery of a warrented item involve considerable Government expense for disassembly/assembly of larger items?
9. Do the end items include special tooling from the subcontractor?
10. Do the end items include reports, designs or drawings?
11. Will reports be the only deliverable item?
12. Are construction, A/E or specifications, the only deliverables?

It is to be understood that these logic questions (LQs) and categories are merely a representative sample, such that for any CD being produced there is usually more categories and LGs than shown in Tables II and III to be selected and answered by a user at a given CS station. As the result of the preliminaries carried out by the steps in blocks 12 and 14 of FIG. 1 for any CD being formed during a SWC. Then the improved software programming method of the invention during continuance of a SWC in carrying out blocks 16 and 18 (as will become more fully apparent hereinafter) provides a unique interrelationship of a series of five multi-line item M/LI multi-data field M/DF logic tables including one or more logic table test results along with a data base of a storage bank of GARCs and a AM/BFCRT all all of which contribute to correctly selecting one or more GARCs as full text or otherwise for a Government CD being formed and with each selected GARC being incorporated at a predetermined CD section. The remaining steps as indicated in FIG. 1 for forming a CD, namely: 20, 22 and 24 are self explanatory.

After the aforementioned data input and as the result of a user at a CS station selecting categories and selectively answering the LQs as shown in Tables II and III; a M/LI, M/DF CT 26 as exemplified by Table IV is formed in the CS data base when a CD is to be produced during a SWC of the improved method.

TABLE IV
CONFIGURATION TABLE FOR A CONTRACTING DOCUMENT

| LI NO. | CDGNDF | LQNDF | LNDF | UADF |
|---|---|---|---|---|
|  | 234 | 65 | FAR_CNT_SUB_PLN | N |
|  | 234 | 291 | FAR_CNT_TL_SUB | N |
|  | 234 | 186 | FAR_CNT_WAL_HLY | N |
|  | 234 | 746 | FAR_COAST_GUARD | N |
| 5 | 234 | 415 | FAR_COBOL_COMP | N |
|  | 234 | 430 | FAR_CODE_NONSTND | N |
|  | 234 | 189 | FAR_COMB_SB_LSA | N |
|  | 234 | 333 | FAR_COMML_EXPT | Y |
|  | 234 | 253 | FAR_COMM_COM | N |
| 10 | 234 | 327 | FAR_COMM_DEF | N |
|  | 234 | 331 | FAR_COMM_DEL | Y |

TABLE IV-continued
CONFIGURATION TABLE FOR A CONTRACTING DOCUMENT

| LI NO. | CDGNDF | LQNDF | LNDF | UADF |
|---|---|---|---|---|
|  | 234 | 218 | FAR_COMM_SUPPLY | Y |
|  | 234 | 495 | FAR_COMP_INCR | N |
|  | 234 | 284 | FAR_CONST_AE | N |
| 15 | 234 | 629 | FAR_CONST_CIVWKS | N |
|  | 234 | 362 | FAR_CONTAIN_TIME | N |
|  | 234 | 2 | FAR_CONTRACT | N |
|  | 234 | 641 | FAR_CONT_PERF | N |
|  | 234 | 734 | FAR_CONUS_DOD | N |
| 20 | 234 | 688 | FAR_CON_WGHT_SHP | Y |
|  | 234 | 288 | FAR_COSPSR_RAD | N |
|  | 234 | 429 | FAR_CRYPT_PROT | N |
|  | 234 | 158 | FAR_CST_AWD_FEE | N |
|  | 234 | 159 | FAR_CST_FIX_FEE | N |
| 25 | 234 | 137 | FAR_CST_FIX_PRI | Y |
|  | 234 | 148 | FAR_CST_FRM_TAR | N |
|  | 234 | 143 | FAR_CST_FX_CEIL | N |
|  | 234 | 161 | FAR_CST_INC_FEE | N |
|  | 234 | 147 | FAR_CST_INC_TGT | N |
| 30 | 234 | 470 | FAR_CST_IN_REV | N |
|  | 234 | 160 | FAR_CST_NO_FEE | N |
|  | 234 | 467 | FAR_CST_PRE_DET | N |
|  | 234 | 145 | FAR_CST_PRI_RED | N |
|  | 234 | 152 | FAR_CST_REM | N |
| 35 | 234 | 496 | FAR_CST_REM_DEF | N |
|  | 234 | 777 | FAR_CST_SEGR | N |
|  | 234 | 154 | FAR_CST_SHARE | N |
|  | 234 | 150 | FAR_CST_SUC_TAR | N |
|  | 234 | 493 | FAR_CTR_FAC_CLM | N |
| 40 | 234 | 286 | FAR_CTR_NAS | N |
|  | 234 | 89 | FAR_CTR_NO_INSUR | N |
|  | 234 | 316 | FAR_CT_ACFT_FUEL | N |
|  | 234 | 546 | FAR_CT_ADV_NOT | N |
|  | 234 | 156 | FAR_CT_CNT_10 | N |
| 45 | 234 | 634 | FAR_CT_COSIGN | N |
|  | 234 | 66 | FAR_CT_CST_CMP | Y |
|  | 234 | 600 | FAR_CT_FAST_PAY | Y |
|  | 234 | 191 | FAR_CT_LAB_SUR | N |
|  | 234 | 623 | FAR_CT_LIQUID | N |
| 50 | 234 | 6 | FAR_CT_MUCH | 3000 |
|  | 234 | 626 | FAR_CT_NEG_CBA | N |
|  | 234 | 90 | FAR_CT_NO_ASIGN | N |
|  | 234 | 633 | FAR_CT_NO_SETOF | N |
|  | 234 | 270 | FAR CNT CONST | N |
| 55 | 234 | 224 | FAR SER REM IMPR | N |
|  | 234 | 162 | FAR CNT SM PUR | Y |
|  | 234 | 76 | FAR SOLICITATION | Y |
|  | 234 | 131 | FAR TC FOR GOV | N |

The various DFs and LIs of the CT are merely representative, such that in fact, the CT would usually include many more line items (LIs) (not shown) for the CD being produced. The CT is generally made up of a series of four related but different DFs, namely: a M/LI common document group no. DF (CDGNDF), a M/LI logic question number DF (LQNDF), a M/LI logic name data field (LNDF) and a M/LI user answer DF (UADF); all as indicated in Table IV. When necessary, the LQNDF identifies the LQ answered for a given CT LI in relation to the LN under the LNDF therefor. Each LN of the CT is shown in abbreviated form under the LNDF and stems from a user selection of categories and LQs, Tables II and III respectively. The answer of any LI of the UADF is Y (yes), N (no) or a specified numerical amount, such as, e.g., 3000 for LI 50. As evident from Table IV, each LI of the CDGNDF has the same common docket group no. (CDGN) for a given CD being produced. Thus, any CT in being generated at any user station by the improved method is associated with only one CD having a given CDGN. To assist the reader in referencing each LI of any DF of the CT, the CT is numbered every five LIs as shown.

For instance, the abbreviated LN under the LNDF at CT LI 1 stands for the Federal Acquisition Regulation: prime contractor's subcontractor plan. Also, the LN under the LNDF at CT LI 25 refers to a FAR: cost, fixed price contract. As to translation of other CT INs at other LIs of the LNDF, some, of course, are obvious or generally known and others are translatable only upon usually acquiring an appropriate reference book published by the Department of Defense of the U.S. Government. In any event, in carrying out the invention, the M/LI M/DF CT for any CDGN, such as, e.g., the CT of Table IV having CDGN 234, etc., is formed and then stored in the interactive CS storage bank (data base) for enabling formation of a CD during a SWC in accordance with the invention.

As best illustrated in Table V below, a M/LI, M/DF logic test table (LTT) is provided for any CD being formed in accordance with the improved invention. The LTT for purposes of illustration as part of the specification is divided up into two sections. These sections are designated left portion (LP) and right portion (RP).

TABLE V

LOGIC TEST TABLE FOR ANY CONTRACTING DOCUMENT

LEFT PROTION (LP)

THREE LEFT SIDE DATA FIELDS (TLSDFs)

| LI NO. | LTNDF | NSTIDF/LS | LSSDDF/LS | LNDF/LS |
|---|---|---|---|---|
|  | FAR32.908(a) | 01 | LT | FAR32.111(d)(1) |
|  | FAR32.908(b) | 01 | LN | FAR_CNT_CONST |
|  | FAR32.908(c) | 01 | LN | FAR_SOLICITATION |
|  | FAR32.908(c) | 02 | LN | FAR_CONTRACT |
| 5 | FAR32.908(c) | 03 | LT | FAR32.908(a) |
|  | FAR32.908(c) | 04 | LT | FAR32.908(b) |
|  | FAR32.908(d) | 01 | LN | FAR_PYMT_EFT |
|  | FAR33.106 | 01 | LN | FAR_SOLICITATION |
|  | FAR33.106 | 02 | LN | FAR_CNT_SM_PUR |
| 10 | FAR33.106(b) | 01 | TF | TRUE |
|  | FAR33.106(b)A1 | 01 | LT | FAR33.106(b) |
|  | FAR33.106(b)A1 | 02 | LN | FAR_CST_REM |
|  | FAR33.214 | 01 | LN | FAR_T_C_FOR_GOV |
|  | FAR33.214 | 02 | LT | DOD52.252-7000 |
| 15 | FAR33.214 | 03 | LT | DOD52.252-7001 |
|  | FAR33.214A1 | 01 | LT | FAR33.214 |
|  | FAR33.214A1 | 02 | LN | FAR_CONT_PERF |
|  | FAR36.501(b)T1 | 01 | LN | FAR_CST_FIX_PRI |
|  | FAR36.501(b)T1 | 02 | LN | FAR_CNT_CONST |
| 20 | FAR26.501(b)T1 | 03 | LN | FAR_CT_MUCH |
|  | FAR36.501(b)T2 | 01 | LN | FAR_CST_FIX_PRI |
|  | FAR36.501(b)T2 | 02 | LN | FAR_CNT_CONST |
|  | FAR36.501(b)T2 | 03 | LN | FAR_CT_MUCH |
|  | FAR36.502T1 | 01 | LN | FAR_CST_FIX_PRI |
| 25 | FAR36.502T1 | 02 | LN | FAR_CNT_CONST |
|  | FAR36.502T1 | 03 | LN | FAR_SER_REM_IMPR |
|  | FAR36.502T1 | 04 | LN | FAR_CNT_SM_PUR |
|  | FAR36-502T2 | 01 | LN | FAR_CST_FIX_PRI |
|  | FAR36.502T2 | 02 | LN | FAR_CNT_CONST |
| 30 | FAR36.502T2 | 03 | LN | FAR_SER_REM_IMPR |
|  | B-05 | 03 | LN | FAR_CNT_IN_DEL |
|  | B-06 | 01 | LN | FAR_CNT_PROV_DOC |
|  | B-07 | 01 | LN | FAR_CST_INC_FEE |
|  | B-07 | 02 | LN | FAR_CNT_FAC |
| 35 | B-07 | 03 | LN | FAR_FND_INCREM |
|  | B-08 | 01 | LN | FAR_CST_INC_FEE |
|  | B-08 | 02 | LN | FAR_CNT_FAC |
|  | B-08 | 03 | LN | FAR_FND_INCREM |
|  | C-01 | 01 | LN | FAR_EQP_BRND_NAM |
| 40 | C-01 | 02 | LN | FR_RPLCMNT_PTS |
|  | C-01 | 03 | LN | FAR_COMM_DEF |
|  | C-02 | 01 | LT | FAR27.303(a) |
|  | C-02 | 02 | LT | FAR27.303(b) |
|  | DOD27.482(h) | 01 | LN | FAR_CNT_CONST |
| 45 | DOD27.482(h) | 02 | LN | FAR_CONST_AE |
|  | DOD27.482(h) | 03 | LN | FAR_SER_ARC_ENG |
|  | DOD27.482(h) | 04 | LT | DOD27.482(i) |
|  | DOD27.482(i) | 01 | LN | FAR_CNT_CONST |
|  | DOD27.482(i) | 02 | LN | FAR_CONST_AE |
| 50 | DOD27.482(i) | 03 | LN | FAR_SER_ARC_ENG |
|  | DOD27.482(i) | 04 | LN | FAR_UNIQUE_BLDG |
|  | DOD27.482(j) | 01 | LN | FAR_SER_ARC_ENG |
|  | DOD27.482(j) | 02 | LN | FAR_ARC_STD |
|  | D-01 | 01 | UK | EQS |
| 55 | DOD10.011(70) | 02 | LT | FAR10.001(b) |

RIGHT PORTION (RP)

| LI NO. | LTOIDF | TWO RIGHT SIDE DFs | | THREE TEST RESULT DFs | | |
|---|---|---|---|---|---|---|
|  |  | LSSDDF/RS | ASDDF/RS | TDF | FDF | NDF |
|  | EQS | TF | TRUE | END | END | END |
|  | EQS | LS | Y | END | END | END |
|  | EQS | LS | Y | 03 | 02 | END |
|  | EQS | LS | Y | 03 | END | END |

TABLE V-continued
LOGIC TEST TABLE FOR ANY CONTRACTING DOCUMENT

|    |       |    |         |      |     |     |
|----|-------|----|---------|------|-----|-----|
| 5  | EQS   | TF | FALSE   | 04   | END | END |
|    | EQS   | TF | FALSE   | END  | END | END |
|    | EQS   | LS | Y       | END  | END | END |
|    | EQS   | LS | Y       | 02   | END | END |
|    | EQS   | LS | N       | END  | END | END |
| 10 | EQS   | TF | TRUE    | END  | END | END |
|    | EQS   | TF | TRUE    | 02   | END | END |
|    | EQS   | LS | Y       | END  | END | END |
|    | EQS   | LS | N       | 02   | END | END |
|    | EQS   | TF | FALSE   | 03   | END | END |
| 15 | EQS   | TF | FALSE   | END  | END | END |
|    | EQS   | TF | TRUE    | 02   | END | END |
|    | EQS   | LS | Y       | END  | END | END |
|    | EQS   | LS | Y       | 02   | END | END |
|    | EQS   | LS | Y       | 03   | END | END |
| 20 | GTE   | LS | 1000001 | END  | END | END |
|    | EQS   | LS | Y       | 02   | END | END |
|    | EQS   | LS | Y       | 03   | END | END |
|    | LTE   | LS | 1000000 | END  | END | END |
|    | EQS   | LS | Y       | 02   | END | END |
| 25 | EQS   | LS | Y       | 04   | 03  | END |
|    | EQS   | LS | Y       | 04   | END | END |
|    | EQS   | LS | N       | END  | END | END |
|    | EQS   | LS | Y       | 02   | END | END |
|    | EQS   | LS | Y       | 04   | 03  | END |
| 30 | EQS   | LS | Y       | 04   | END | END |
|    | EQS   | LS | Y       | END  | END | END |
|    | EQS   | LS | Y       | END  | END | END |
|    | EQS   | LS | Y       | 02   | END | END |
|    | EQS   | LS | N       | 03   | END | END |
| 35 | EQS   | LS | N       | END  | END | END |
|    | EQS   | LS | Y       | 02   | END | END |
|    | EQS   | LS | N       | 03   | END | END |
|    | EQS   | LS | Y       | END  | END | END |
|    | EQS   | LS | Y       | 02   | END | END |
| 40 | EQS   | LS | Y       | END  | 03  | END |
|    | EQS   | LS | Y       | END  | END | END |
|    | EQS   | TF | TRUE    | END  | 02  | END |
|    | EQS   | TF | TRUE    | END  | 03  | END |
|    | EQS   | LS | Y       | 02   | 03  | END |
| 45 | EQS   | LS | Y       | 04   | END | END |
|    | EQS   | LS | Y       | 04   | END | END |
|    | EQS   | TF | FALSE   | END  | END | END |
|    | EQS   | LS | Y       | 02   | 03  | END |
|    | EQS   | LS | Y       | 04   | END | END |
| 50 | EQS   | LS | Y       | 04   | END | END |
|    | EQS   | LS | Y       | END  | END | END |
|    | EQS   | LS | Y       | 02   | END | END |
|    | EQS   | LS | Y       | END  | END | END |
|    | "Y"   | UK | END     | END  | END | END |
| 55 | EQS   | TF | TRUE    | END  | END | END |

The LTT is predetermined and a permanent part of the interactive CS storage bank. The LTT is generally made up of a series of ten different M/LI DFs, namely: a logic test name DF (LTNDF), three left side DFs (TLSDFs), a logic test operand identification DF (LTOIDF), two right side DFs TRSDFs and three test result DFs (TTRDFs) of a TDF for true (T), a FDF for false (F) and a NDF for unknown (N). The TLSDFs are a numerical subtest identification DF/LS (NSTIDF/LS), a logic selection symbol designated DF/LS (LSSDDF/LS) and a LNDF/LS. The TRSDFs are LSSDDF/RS 48 and an answer symbol designated DF/RS (ASDDF/RS). As is evident from Table V RP, the TDF or the FDF at any LTT LI provides either an "END" answer as a major test result of true or false respectively or a subtest number of greater than one test result, e.g., 02, 03 or 04 all as the result of logic analysis of any LTT LI as hereinafter described. Whereas the NDF at any LTT LI specifies only an "END" major test result of unknown during logic analysis of any LTT LI as hereinafter described. The LTT LTNDF specifies at any LTT LI a LTN in terms of its alpha-numeric identification designation (ANID) such as, e.g., FAR 32.908(c) at LTT LI 5. The LSSDDF/LS specifies for any LTT LI, the logic of LN, LT or TF for logic name, logic test name or true or false respectively. The LNDF of the LTT is comprised of all the possible LNs for any CD to be produced relative to a Government or contractor procurement operation where any LN is specified in alpha-numeric, abbreviated or plain word fashion. It is to be understood, although not shown in Table V LP, that the LNDF includes all the LNs of the CT LNDF for a CD, e.g., all LNs under the LNDF of the CT (Table IV). In other words, as will become more apparent hereinafter, the LTT is the predetermined master logic as permanently stored in the storage bank of a CS along with the GARCs, other logic tables and an AM/BFCRT all therein for enabling the carrying out of the improved software programming method of the invention in response to any customer request as effected by a CS station user. Moreover, the LN of any LI under the LTT LNDF is designated in the same fashion as the LN of any LI under the CT LNDF, e.g., the LN under the LNDF at LI 50 of the CT corresponds to the LN at LI 23 under the LTT LNDF. The LTOIDF (Table V RP) provides at any LI thereof "EQS" for equals, "LTE" for less than equals or "GTE" for greater than equals where "EQS", "LTE" or "GTE" specifies the particular logic analysis for a LTT LI during a SWC as hereinafter described. The LSSDDF/RS specifies for any LI thereof "TF" for true false or "LS" for logic string. Logic string means the analysis of logic of a series of DFs of at least one logic table in obtaining an END or subtest no. test result for a LTT LI as hereinafter described. The ASDDF/RS for any LI thereof specifies "TRUE", "FALSE", any numerical value, "Y" for yes or "N" for no. The interrelationship of the various LTT DFs either with the CT DFs for any CT LI or with the DFs of any other logic table at a LI thereof now to be described will become more apparent for carrying out a complete and enhanced logic analysis with one or more test results to determine selection/nonselection of one or more GARCs for a CD being formed in response to user input during a SWC in carrying out the invention. It is noted here that for the sake of brevity, not all logic names (LNs) of the CT and LTT are shown. Reference is made to LTT LI 54 where the logic under the LTNDF, the LSSDDF/LS, the LNDF/LS, the LTOIDF, the LSSDDF/RS and the ASDDF/RS is inconsistent with the logic specified above for the LTT DFs. Despite this inconsistency, LTT LI 54 or any other LTT LI not shown that has such inconsistent logic for any LTT DF does not interfere with the continued operation of a SWC but normally results in an END test result under LTT NDF at LTT LI 54.

As depicted in Table VI below, a M/LI M/DF logic test results table (LTRT) for a CD is also provided as part of the CS data base when a CD is being formed during a SWC.

TABLE VI

LOGIC TEST RESULTS TABLE FOR A CONTRACTING DOCUMENT

| LI NO. | CDGNDF | LTNDF | LTRDF |
|---|---|---|---|
|  | 234 | B-05 | N |
|  | 234 | D-01 | N(N) |
|  | 234 | D-02(N) | T |
|  | 234 | E-01 | F |
| 5 | 234 | DOD10.004(b)(3) (ii) (B) | T |
|  | 234 | DOD10.011(71)T1 | T |
|  | 234 | DOD10.011(71)T2 | F |
|  | 234 | DOD10.011(72) | F |
|  | 234 | DOD10.011(73) | F |
| 10 | 234 | DOD10.102(b) | F |
|  | 234 | DOD14.201-6(70) | F |
|  | 234 | DOD15.875 | T |
|  | 234 | DOD22.1006(70) | N |
|  | 234 | DOD22.7202 | N |
| 15 | 234 | DOD25.305(c) | N |
|  | 234 | DOD28.7002(a) | N |
|  | 234 | DOD4.670-5(a) | T |
|  | 234 | DOD43.205(70) | N |
|  | 234 | DOD43.205(71) | T |
| 20 | 234 | DOD52.235-7005 | N |

TABLE VI-continued

LOGIC TEST RESULTS TABLE FOR A CONTRACTING DOCUMENT

| LI NO. | CDGNDF | LTNDF | LTRDF |
|---|---|---|---|
|  | 234 | DOD70.1103(a) (1) | T |
|  | 234 | DOD70.310(a) | T |
|  | 234 | DOD70.310(c) | T |
|  | 234 | DOD70.310(d) | T |
| 25 | 234 | E-02 | N |
|  | 234 | E-03 | T |
|  | 234 | E-04 | F |
|  | 234 | E-05 | F |
|  | 234 | F-01 | F |
| 30 | 234 | F-02 | F |
|  | 234 | F-03 | F |
|  | 234 | FAR10.011(a) | F |
|  | 234 | FAR10.011(b) | F |
|  | 234 | FAR10.011(c) | T |
| 35 | 234 | FAR10.001(e) | T |
|  | 234 | FAR10.011(f) | T |
|  | 234 | FAR10.011(g) | T |
|  | 234 | FAR12.104(a) (2) | F |
|  | 234 | FAR12.104(a) (2) (T1) | F |
| 40 | 234 | FAR12.104(a) (2) (A1) | F |
|  | 234 | FAR12.104(a) (2) (A2) | F |
|  | 234 | FAR12.104(a) (2) (A3) | F |
|  | 234 | FAR12.104(b) | F |
|  | 234 | FAR12.104(b)A1 | F |
| 45 | 234 | FAR12.204(a) | T |
|  | 234 | FAR12.403(a) | T |
|  | 234 | FAR12.403(b) | T |
|  | 234 | FAR32.111(c) (1) | T |
|  | 234 | FAR33.214 | N(T) |
| 50 | 234 | FAR36.502T2 | F |
|  | 234 | FAR 32.908(a) | N |
|  | 234 | FAR 36.501(b) T1 | F |
|  | 234 | FAR 36.501(b) T2 | F |
|  | 234 | FAR 32.908(c) | N(T) |
| 55 | 234 | FAR 33.106(b) | T |
|  | 234 | DOD 27.482(b) | N |
|  | 234 | C-02 | N(T) |

It is generally made up of a CDGNDF, a LTNDF and a logic test results DF (LTRDF). It is noted here that any LTN under the LTRT at a LI thereof also appears (even though it may not be shown in another table for the sake of brevity) as a LTN at a LI under the LTT LTNDF (Table V LP) and at a LI under the LTNDF of the LTNT as discussed next paragraph in relation to Table VII. The LTRDF of the LTRT at any LI thereof specifies T (true), F (false) or N (unknown) as the result of an END major test result for a LTT LI during logic analysis of the LTT LI. As will become more apparent hereinafter, when a LTRT for a CD specifies at any LI thereof under LTRDF a "T" answer, it determines correct selection of a GARC during a SWC after LTRT analysis of any N answers under the LTRT LTRDF as hereinafter described.

In the manner shown in Table VII, a M/LI M/DF logic test name table (LTNT) is provided that is a predetermined and permanent part of the CS storage bank when a CD is formed.

TABLE VII

LOGIC TEST NAME TABLE FOR ANY CONTRACTING DOCUMENT

| LI NO. | LTNDF | WCSDF | ANIDDF |
|---|---|---|---|
|  | DOD28.309(70) | I | DFAR 252.228-7003 |
|  | DOD28.103-02(a) (4) | L | DFAR 252.228-7004 |
|  | DOD28.7101 | I | DFAR 252.228-7006 |
|  | DOD228.101(3) (b) | I | DFAR 252.228-7007 |
| 5 | DOD29.402-01(70) | I | DFAR 252.229-7000 |
|  | DOD31.201 | I | DFAR 252.231-7000 |
|  | DOD31.7001(d) (1) | I | DFAR 252.231-7001 |
|  | DOD31.7001(d) (2) | I | DFAR 252.231-7002 |
|  | DOD32.412(70) | I | DFAR 252.232-7001 |
| 10 | DOD32.412(71) | I | DFAR 252.232-7002 |

TABLE VII-continued
LOGIC TEST NAME TABLE FOR ANY CONTRACTING DOCUMENT

| LI NO. | LTNDF | WCSDF | ANIDDF |
|---|---|---|---|
| | DOD32.502-04(70) | I | DFAR 252.232-7003 |
| | DOD32.502-04(71) | I | DFAR 252.232-7004 |
| | DOD32.111(71) | I | DFAR 252.232-7005 |
| | DOD32.111(72) | I | DFAR 252.232-7006 |
| 15 | DOD32.502-04(72) | I | DFAR 252.232-7007 |
| | DOD32.502-04(73)A1 | I | DFAR 252.232-7007ALT-1 |
| | DOD32.502-04(74)A2 | I | DFAR 252.232-7007ALT-2 |
| | DOD33.7000 | I | DFAR 252.233-7000 |
| | DOD34.005-71T1 | L | DFAR 252.234-7000 |
| 20 | DOD34.005-71T2 | I | DFAR 252.234-7001 |
| | DOD35.071(a) | I | DFAR 252.235-7000 |
| | DOD35.071(b) | I | DFAR 252.235-7001 |
| | DOD35.071(d) | I | DFAR 252.235-7003 |
| | DOD35.071(e) | I | DFAR 252.235-7004 |
| 25 | DOD52.235-7005 | I | DFAR 252.235-7005 |
| | DOD36.571-01 | I | DFAR 252.236-7000 |
| | DOD36.571-02 | I | DFAR 252.236-7001 |
| | DOD36.571-03 | I | DFAR 252.236-7002 |
| | DOD36.572-01 | I | DFAR 252.236-7004 |
| 30 | DOD36.572-02 | I | DFAR 252.236-7005 |
| | DOD36.572-03 | I | DFAR 252.236-7006 |
| | DOD36.572-05 | I | DFAR 252.236-7008 |
| | DOD36.572-06(a) | L | DFAR 252.236-7009(a) |
| | DOD36.572-06(b) | L | DFAR 252.236-7009(b) |
| 35 | DOD36.572-08 | I | DFAR 252.236-7011 |
| | DOD36.572-09 | I | DFAR 252.236-7012 |
| | DOD36.572-10 | I | DFAR 252.236-7013 |
| | DOD36.573-01 | I | DFAR 252.236-7014 |
| | DOD36.573-03 | I | DFAR 252.236-7016 |
| 40 | DOD36.573-04 | I | DFAR 252.236-7017 |
| | DOD36.574 | I | DFAR 252.236-7018 |
| | DOD36.513 | I | DFAR 252.236-7019 |
| | DOD36.513A1 | I | DFAR 252.236-7019ALT-1 |
| | DOD36.580-01 | L | DFAR 252.236-7081 |
| 45 | DOD36.580-02 | M | DFAR 252.236-7082 |
| | DOD37.304(70) | C | DFAR 252.237-7000 |
| | DOD37.304(70)A1 | C | DFAR 252.237-7000ALT-1 |
| | DOD37.7103(a) | M | DFAR 252.237-7100 |
| | DOD37.7103(b) | M | DFAR 252.237-7101 |
| 50 | DOD37.7103(c)T1 | F | DFAR 252.237-7102 |
| | DOD37.7103(c)T2 | F | DFAR 252.237-7103 |
| | DOD37.7103(c)T3 | D | DFAR 252.237-7104 |
| | DOD37.7103(c)T4 | F | DFAR 252.237-7105 |
| | DOD37.7103(c)T5 | G | DFAR 252.237-7106 |
| 55 | DOD37.7103(c)T6 | F | DFAR 252.237-7107 |
| | FAR10.011(f) | L | FAR 52.210-06 |
| | FAR10.011(g) | I | FAR 52.210-07 |
| | FAR33.214 | I | FAR 52.233-01 |
| | FAR33.106(b) | H | FAR 52.236-01 |

It is generally made up of a LTNDF, which contract section DF (WCSDF) for a selected GARC and an alpha-numeric identification designated DF (ANIDDF) for any GARC. For the sake of bervity, all LTNs of the LTNDF of the LTNT are now shown but it is to be understood that a LTN under the LTNDF of the LTNT at any LI thereof has a corresponding LTN at a LI under the LTT LTNDF as well as at a LI under the LTRT LTRDT.

As illustrated in Table VIII, a M/LI M/DF pattern table (PT) is provided as part of the CS data base when a CD is being formed during a SWC.

TABLE VIII
PATTERN TABLE FOR A CONTRACTING DOCUMENT

| LI NO. | CDGNDF | WCSDF | ANIDDF FOR ANY SELECTED GARC | AM/BFCDF |
|---|---|---|---|---|
| | 234 | L | DFAR 252.204-7007 | 000000 |
| | 234 | L | DFAR 252.210-7000 | 000000 |
| | 234 | L | DFAR 252.210-7002 | 000000 |
| | 234 | I | DFAR 252.215-7002 | 000000 |
| 5 | 234 | I | DFAR 252.243-7001 | 100000 |
| | 234 | I | DFAR 252.270-7001 | 100000 |
| | 234 | M | DFAR 252.270-7003 | 000000 |
| | 234 | I | DFAR 252.270-7004 | 000000 |
| | 234 | I | DFAR 252.270-7101 | 100000 |
| 10 | 234 | I | FAR 52.202-01 | 101000 |
| | 234 | I | FAR 52.203-01 | 100000 |
| | 234 | I | FAR 52.203-03 | 100000 |
| | 234 | K | FAR 52.203-04 | 000000 |
| | 234 | I | FAR 52.203-05 | 100000 |
| 15 | 234 | I | FAR 52.203-06 | 100000 |

| LI NO. | CDGNDF | WCSD | ANIDDF FOR ANY SELECTED GARC | AM/BPCDF |
|---|---|---|---|---|
| | 234 | I | FAR 52.203-07 | 100000 |
| | 234 | I | FAR 52.204-01 | 100000 |
| | 234 | I | FAR 52.207-03 | 100000 |
| | 234 | K | FAR 52.207-04 | 000000 |
| 20 | 234 | K | FAR 52.208-02 | 000000 |
| | 234 | L | FAR 52.210-03 | 000000 |
| | 234 | I | FAR 52.210-05 | 110000 |
| | 234 | L | FAR 52.210-06 | 120000 |
| | 234 | I | FAR 52.210-07 | 110000 |
| 25 | 234 | F | FAR 52.212-04 | 120000 |
| | 234 | F | FAR 52.212-09 | 100000 |
| | 234 | F | FAR 52.212-10 | 120000 |
| | 234 | F | FAR 52.212-13 | 121000 |

TABLE VIII-continued

PATTERN TABLE FOR A CONTRACTING DOCUMENT

|    | 234 | F | FAR 52.212-15 | 120000 |
|----|-----|---|---------------|--------|
| 30 | 234 | I | FAR 52.213-01 | 021000 |
|    | 234 | L | FAR 52.215-04 | 120000 |
|    | 234 | L | FAR 52.215-05 | 100000 |
|    | 234 | K | FAR 52.215-06 | 000000 |
|    | 234 | L | FAR 52.215-07 | 100000 |
| 35 | 234 | L | FAR 52.215-08 | 100000 |
|    | 234 | L | FAR 52.215-09 | 100000 |
|    | 234 | L | FAR 52.215-10 | 100000 |
|    | 234 | K | FAR 52.215-11 | 000000 |
|    | 234 | L | FAR 52.215-12 | 100000 |
| 40 | 234 | L | FAR 52.215-16 | 100000 |
|    | 234 | K | FAR 52.215-20 | 000000 |
|    | 234 | I | FAR 52.215-33 | 100000 |
|    | 234 | M | FAR 52.217-04 | 100000 |
|    | 234 | K | FAR 52.219-02 | 000000 |
| 45 | 234 | K | FAR 52.219-03 | 000000 |
|    | 234 | K | FAR 52.220-01 | 100000 |
|    | 234 | K | FAR 52.222-22 | 000000 |
|    | 234 | K | FAR 52.222-25 | 000000 |
|    | 234 | I | FAR 52.222-26 | 101000 |
| 50 | 234 | I | FAR 52.222-36 | 101000 |
|    | 234 | K | FAR 52.223-01 | 000000 |
|    | 234 | I | FAR 52.225-03 | 100000 |
|    | 234 | K | FAR 52.225-12 | 000000 |
|    | 234 | H | FAR 52.236.01 | 101000 |
| 55 | 234 | F | DOD 15.875    | 010000 |
|    | 234 | I | E-03          | 110000 |

The PT is generally made up of a CDGNDF, a WCSDF, an ANIDDF for each selected GARC and an attribute multibyte flag code DF (AM/BFCDF). Each byte flag code of a PT LI stems from correct selection of a byte flag code from a data base stored AM/BFCRT (not shown) as further described hereinafter. The WCSDF specifies at any LI thereof which contract section a selected GARC is to be incorporated in a CD being formed. As will become more apparent hereinafter, certain bits of any byte logic of the AM/BFCDF at each LI thereof specifies how a selected GARC is to be incorporated in a CD, full text or otherwise. It is to be understood that the PT of Table VIII constitutes a representative sample of correctly selected GARCs for a CD being formed during a SWC of the improved method.

An operative embodiment of the invention will now be described. Accordingly, reference will now be made to FIG. 2A. As indicated by a program block 90, a user has initiated the main routine of a SWC as exemplified by blocks 12 and 14 of FIG. 1 as well as logging onto a computer operating software system. Then, the CDGN assigned to both a LTRT and a PT for a previously formed CD is deleted from these tables as indicated by block 92. As confirmed by block 94 and 96, an initial or next LI, if any, is selected from the LTT for processing in order to initialize logic analysis and progressive test result determination whether or not a GARC at the next LTT LI as analized by the improved software programming method is favorably considered for selection to the CD being formed by a user at a CS station. If there is no LTT LI to be analized during this part of the SWC of the improved method for forming a CD, such as, e.g., all LTT LIs have been analized with END test results, then block 96 provides a "NO" output to blocks 95 and 97 and then to a block in FIG. 2E as hereinafter described. Assuming that there is an initial or another (next) LTT LI being selected for analysis, block 96 provides a "YES" output and if a test result for a selected LTT LI during a SWC has not been finished (meaning a subtest test no. test result has occurred), then a block 98 provides a "NO" output to block 100. In other words and as will be more fully described, block 98 provides a "no" output either because just starting LTT analysis with no prior selected LTT LI as one condition or because the logic in the prior selected LTT LI has only have partially analized as another condition all during a SWC in forming a CD. Otherwise, a "Yes"-'output of block 98 is provided for a selected LTT LI that has been analized with a finished test result during a SWC in forming a CD results in a by pass of any remaining subtest (block 99) for the LTT LI. Then, if the subtest for a LTT LI selected for analysis is current under the NSTIDF/LS during the part of a SWC, then block 100 provides a "YES" output. Otherwise block 100 provides a "NO" output to block 102 until a correct or current subtest is obtained under the NSTIDF/LS for the LTT LI being selected and prior to the analysis thereof. In other words, the combined action of blocks 98 and 100 regardless of "YES" or "NO" outputs assures a LTT LI is selected with its correct subtest under the NSTIDF/LS and in proper sequence for analysis during this part of a SWC in progressively forming a CD in accordance with the invention all of which will become more apparent hereinafter.

Figure 2A:
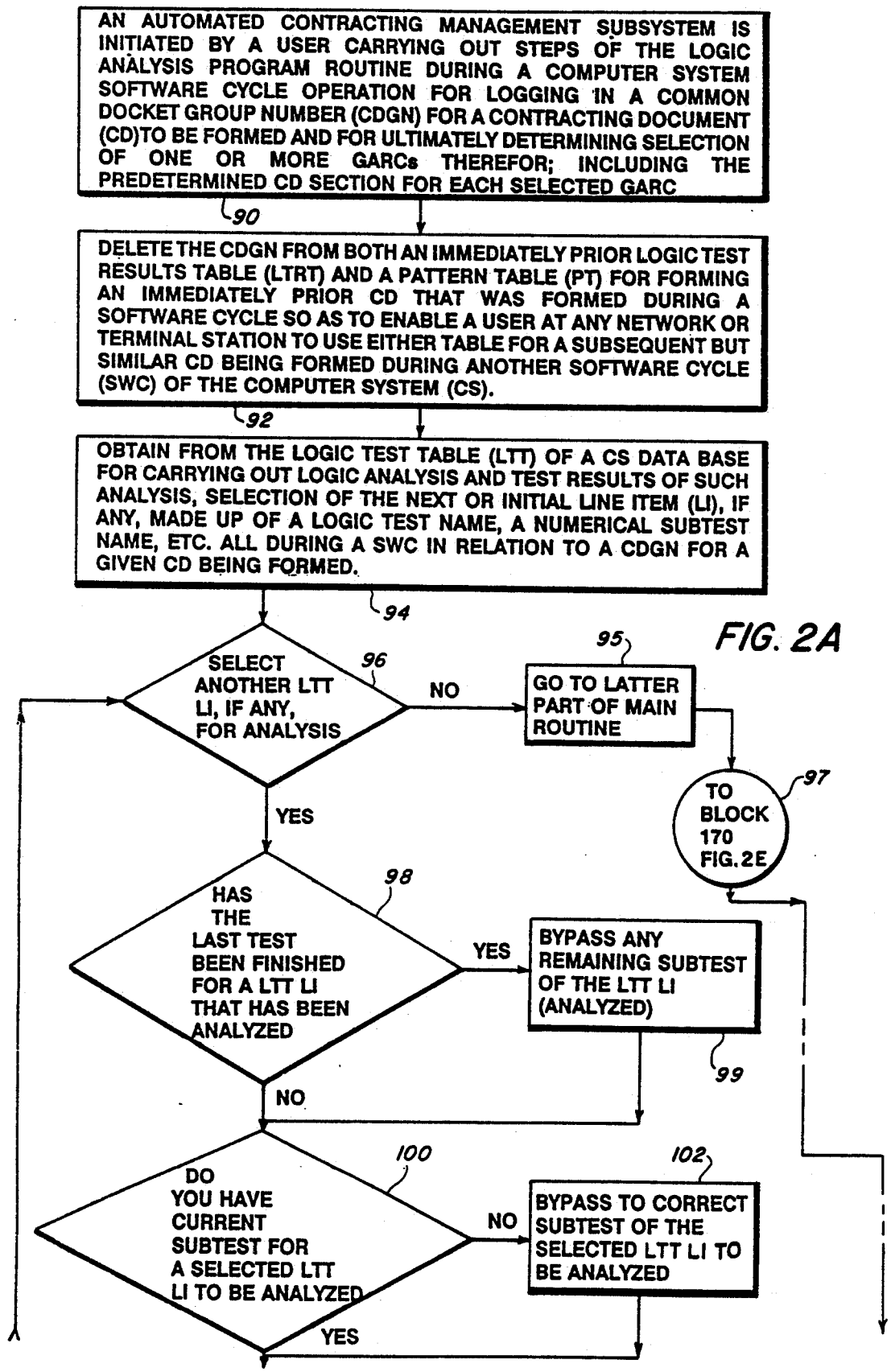
FIGS. 2A–2H is a series of eight schematic views of an operative embodiment of a novel flow chart of the SWC for carrying out steps of the improved software programming method of the invention in producing a CD in response to a user request.
Figure 2B:
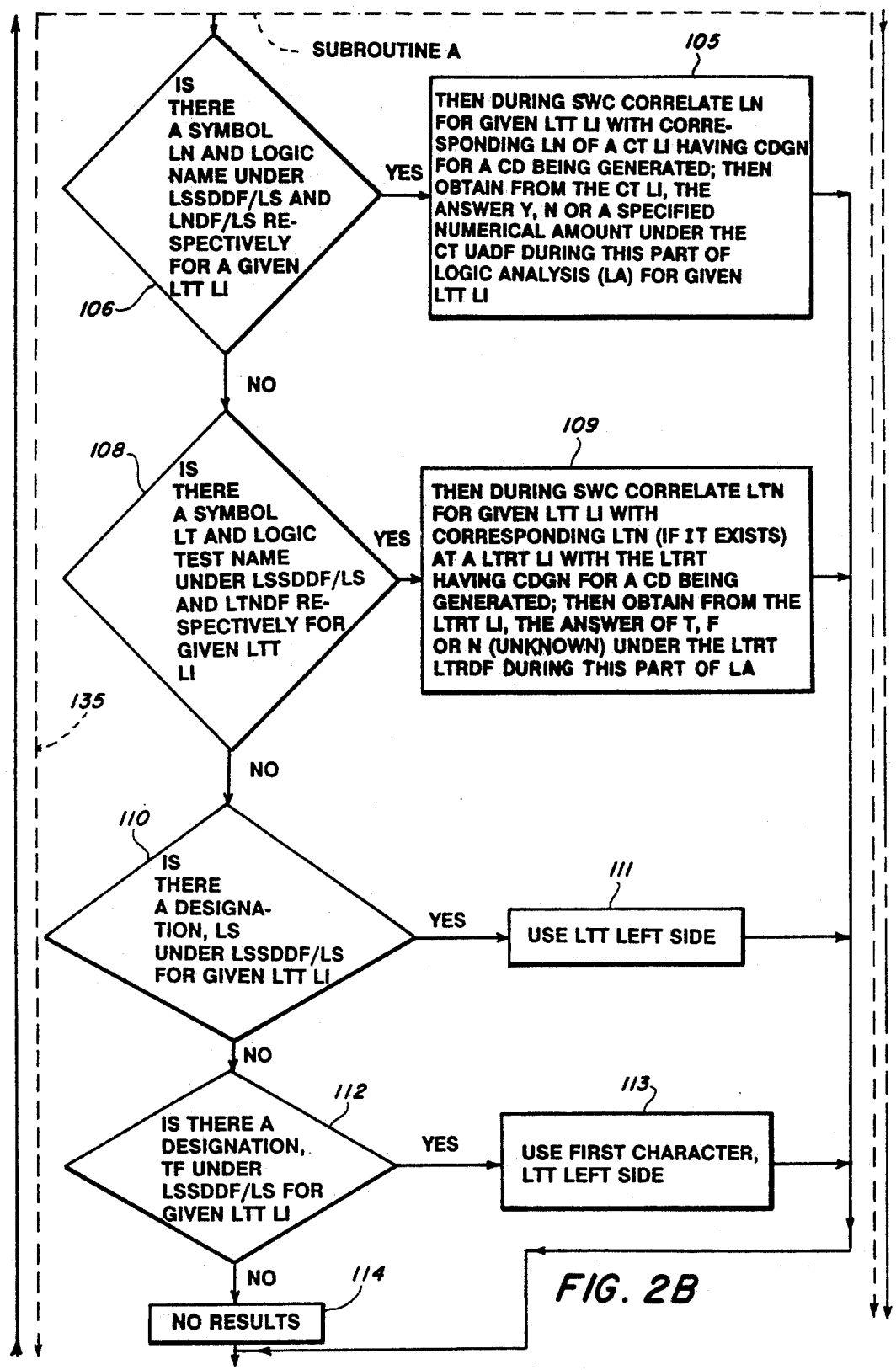

As indicated in FIG. 2B and after proper selection of the initial or next LTT LI to be analized, a series of four blocks 106, 108, 110 and 112 review the left side of the LTT for any given LTT LI selected for analysis during a SWC for forming a Government CD. For example Table V LP, LTT LI 13 the left side thereof has the symbol, LN designated under the LSSDDF/LS as the selected logic and the LN identified under the LNDF/LS. Thus, for this example, only block 106 (of the series of four blocks 106, 108, 110 and 112) for the LTT LI 13 would provide a "Yes" output. Also, the left side of LTT LI 13 under the NSTIDF/LS specifies that this LTT LI is subtest number no. 1. Then block 105 during a SWC for forming a CD in response to the "Yes" output of block 106 would correlate the LN under the LTT LNDF at LI 13 as the result of searching and identifying the corresponding LN under the CT LNDF at the CT LI 58 (Table IV) so as to identify the "N" (No) answer of the CT UADF LI 58 during a SWC and this part of the analysis. Because the "Yes" outputs of all blocks 106, 108, 110 and 112 are parallel interconnected as evident in FIG. 2B, then only one block 106, 108, 110 or 112 needs to provide a "Yes" output during a SWC to avoid the "NO" results of block 114. It is noted here that for another selected LTT LI for analysis during a SWC, the LSSDDF/LS can specify LT for logic test name and then identify the LTN under the LTT LTNDF for the other LTT LI such as, e.g., a LTT LI with LT under the LSSDDF/LS causes the "YES" output of block 108 being subject to the instructions of block 109. The LTT as presently configured in Table V has no LS designation for its left side as queried by block 110. However, LTT LI 10 does provide the designation "TF" for its left side; and thus, the "YES" output of block 112 would be subject to the instruction of block 113 during a SWC. On the other hand, when any LTT LI provides a logic designation under a LTT DF/LS that is not specified by blocks 106, 108, 110 and 112, then all blocks would provide "NO" outputs as indicated by block 114 and a block 132 in FIG. 2D would provide a "YES" output to block 134 (FIG. 2D); and thus; to block 96 (FIG. 2A) for selection of another LTT LI, if any, to be analized during a SWC. When a selected LTT LI just analized by blocks 106, 108, 110 and 112 has insufficient logic, e.g. LTT LI 54, it would provide a NDF END test result and a "N" answer (blocks 132 and 134) under the LTRDF at the initial or next LTRT LI during this part of a SWC for forming a CD.

Figure 2C:
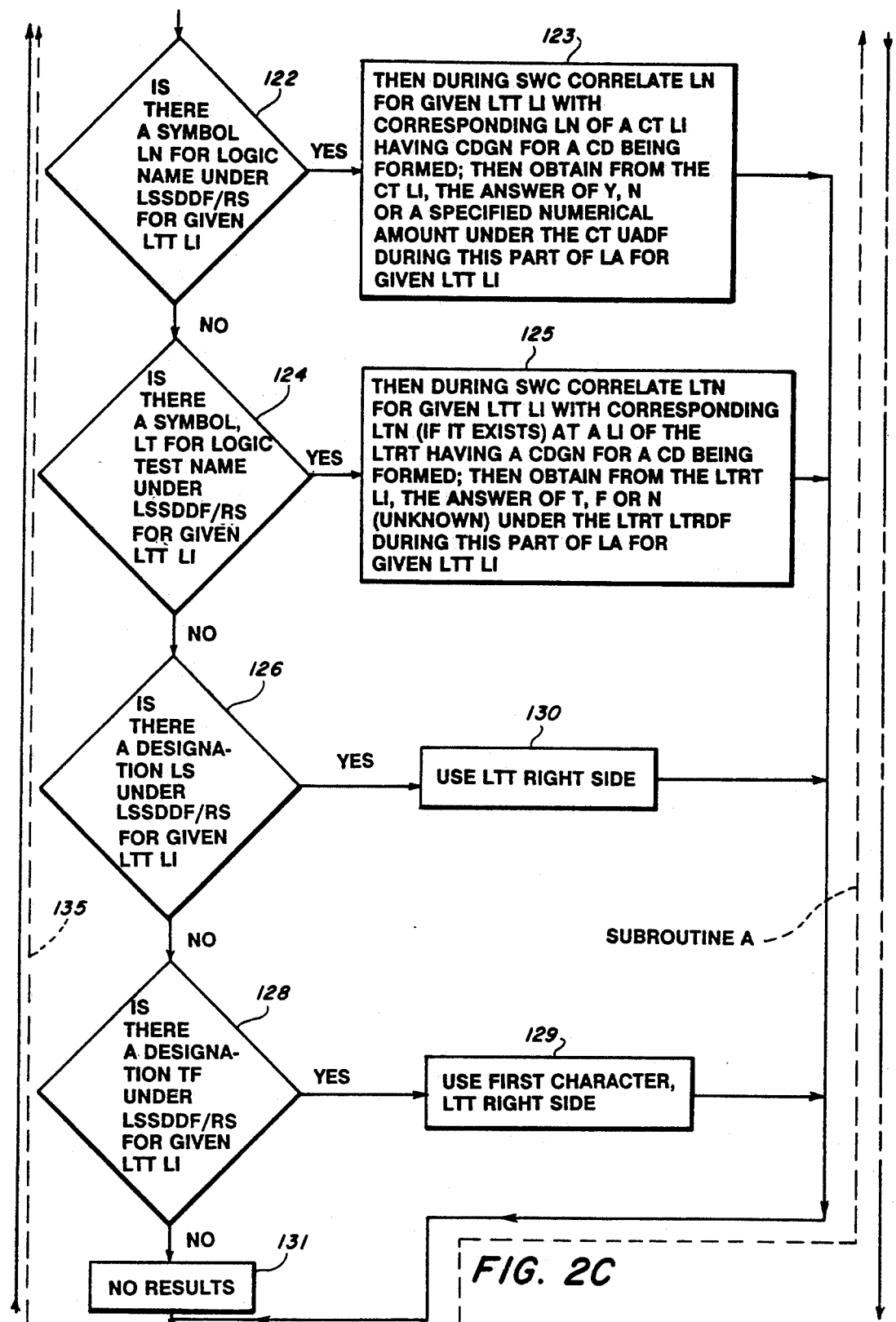
Figure 2D:
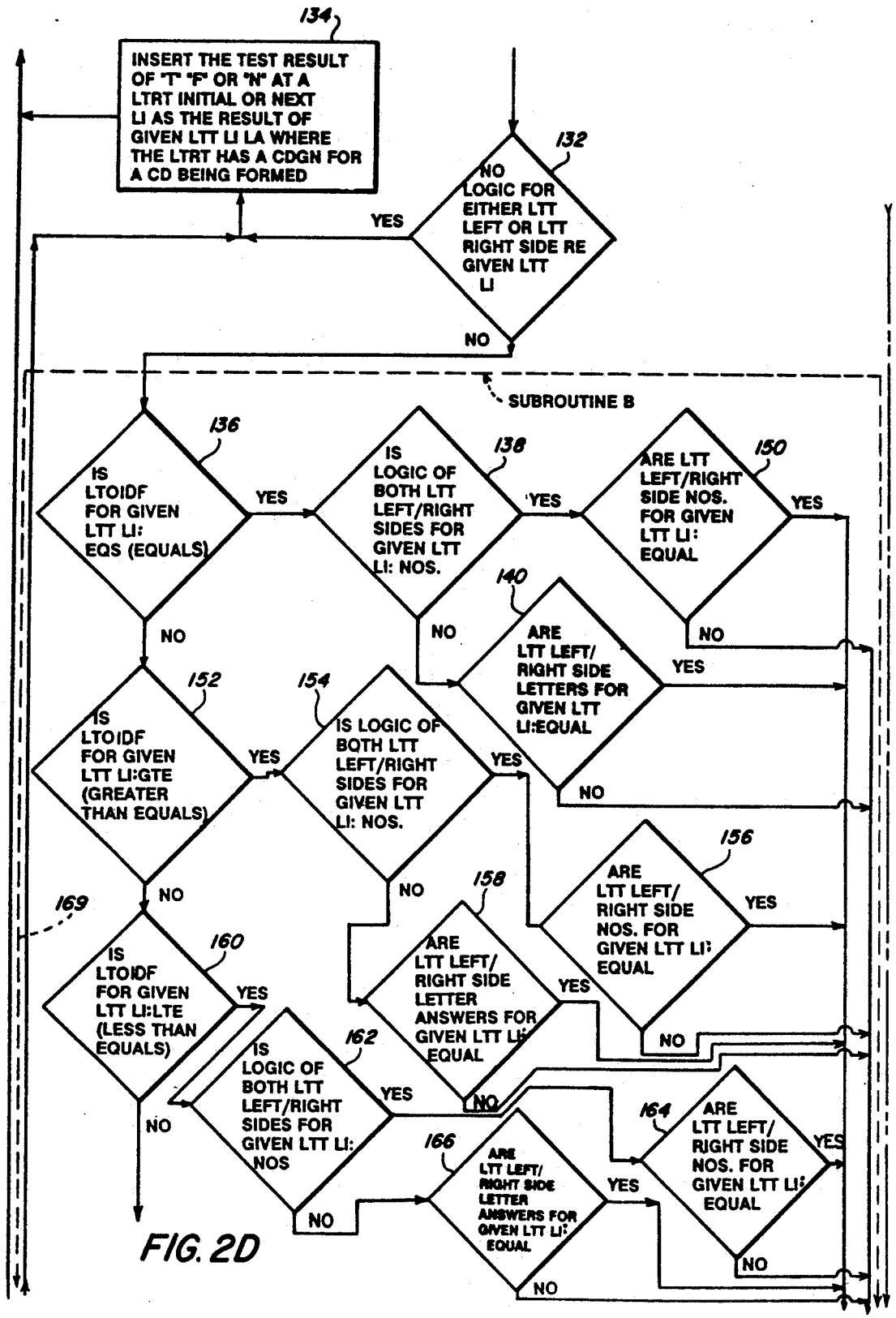

As further depicted in FIG. 2C, a series of four blocks 122, 124, 126 and 128 concern the right side of the LTT for a given LTT LI selected for analysis during a SWC for forming a CD. The LTT as presently configured in Table V RP, its TRSDFs would provide no designation of LN or LTN; and thus, blocks 122 and 124 would always provide "NO" outputs during any SWC of the improved software programming method for forming a CD. On the other hand, LTT LIs 1 and 2 because the LSSDDF/RS specifies "TF" and "LS" respectively, block 128 for LTT LI 1 would provide a "YES" output and block 126 for LTT LI 2 would also provide a "YES" output. If all blocks 122, 124, 126 and 128 provide "NO" outputs to block 131 for a LTT LI during a SWC of the improved method, then block 132 provides a "YES" output to block 134 as depicted in FIG. 2D. Then the just analized LTT LI by the aforesaid blocks 122, etc., e.g. LTT LI 54, would have a NDF END test result and an "N" answer under the LTRDF at the next or initial LTRT LI as confirmed by blocks 132 and 134 during this part of the SWC for forming a CD. In short if there is insufficient logic for any selected LTT LI upon its analysis during a SWC as detected by the combined "NO" outputs of either set of blocks 106, 108, 110 and 112 or 122, 124, 126 and 128, no further analysis of this LTT LI occurs at this time during this part of the SWC. At the same time, the initial or next LTRT LI (as the result of this analysis result of a selected LTT LI being analized) has an "N" answer (blocks 132 and 134). But, when the LTRT "N" answers are analized themselves after analysis of all LTT LIs during a SWC along with of LTT LIs associated therewith, then these associated LTT LIs are reanalized again for determining whether or not any "N" answer under the LTRT LTRDF at a LTRT LI remains unchanged or changed to a "T" or "F" answer as hereinafter described.

However, it is now assumed that at least one block of either one set of four blocks: 106, 108, 110 and 112 or at least one block of another set of four blocks: 122, 124, 126 and 128 provided a "YES" output in accordance with the SW program of FIGS. 2B-2C. Also, that block 132 provided a "NO" output (FIG. 2D) for a LTT LI selected for analysis during this part of a SWC so that the selected LTT LI is subject to further analysis and test result determination as will now be described. It is further noted here that blocks 105-106, 108-114, 122-126 and 128-131 are encompassed by a dotted line 135 that is also designated Subroutine A. This Subroutine will be more fully explained hereinafter.

Figure 2E:
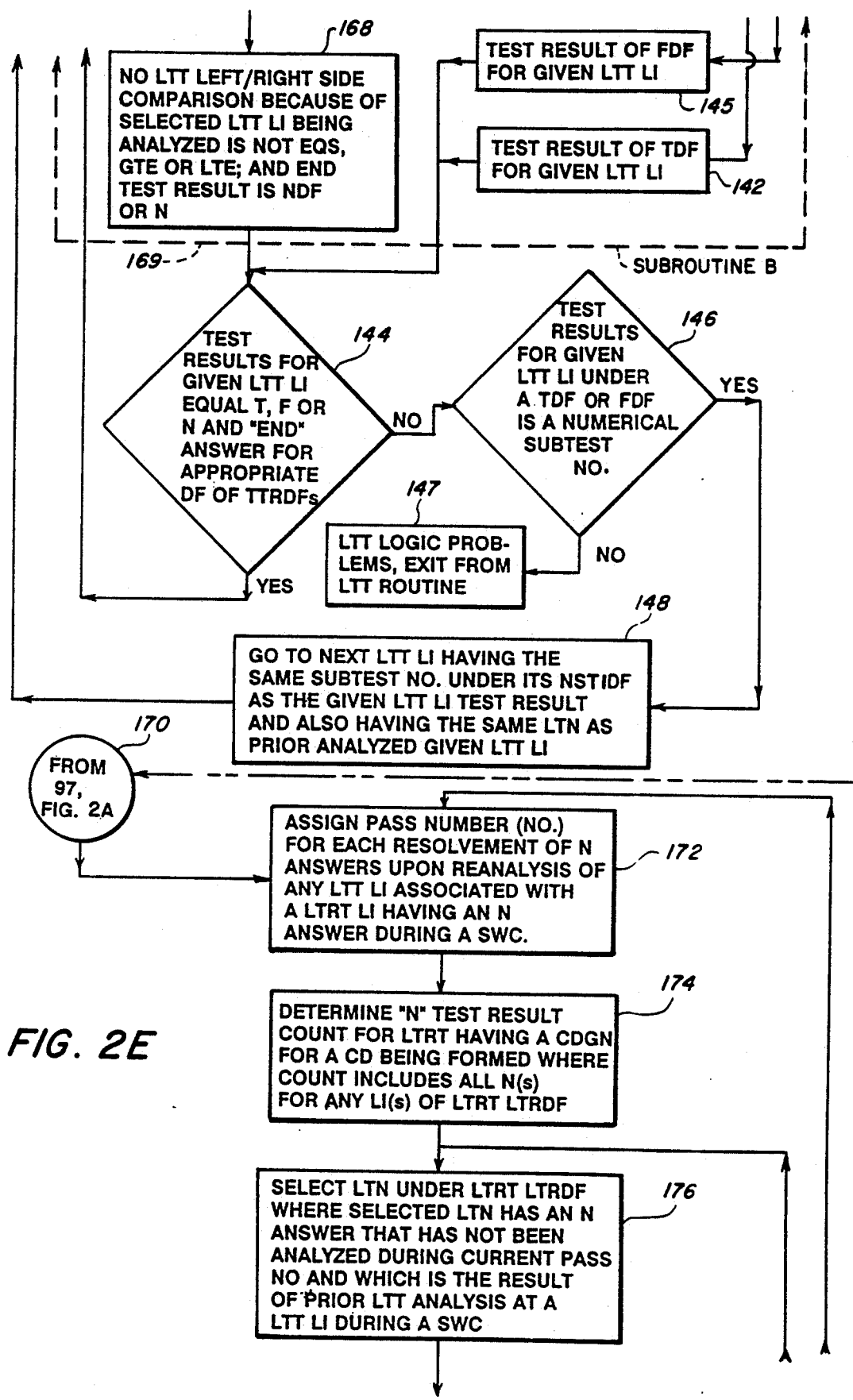

For example, reference is now made to LTT LI 28 and a decision block 136 (FIG. 2D), it provides a "YES" output to block 138, since LTT LI 28 under LTOIDF 46 specifies "EQS" (equals), Table V RP. With reference to a block 138, it provides a "NO" output because both left and right side DF answers of LTT LI 28 are not numbers other than LTT NSTIDF/LS which specifies that this is subtest no. 01. Thus, a decision block 140 in response to the NO output of block 138 provides a "Yes" output for "TRUE" (T) because LTT LN of the LNDF at LTT LI 28 and CT LN LI 25 thereof correspond and the CT UADF LI 25 thereof provides a "Y" answer for yes. This answer corresponds to the "Y" (Yes) answer of LTT the ASDDF/RS LI 28 thereof and is in accordance with the LS symbol of the LSSDDF/RS at LTT LI 28 in carrying out the DF analysis of LTT LI 28 and CT LI 25. It is noted here that the improved method in carrying out the logic analysis of LTT LI 28 together with CT LI 25, the LTT LSSDDF/RS of LTT LI 28 specifies "LS" which indicates the logic analysis is a logic string that includes the logic of LTT LI 28 and CT LI 25 as aforedescribed. However, the TDF of the TTRDFs for LTT LI 28 specifies a subtest no. 02 test result. Because TDF at LTT LI 28 specifies subtest 02 and block 140 provides a "YES" output, then block 144 (as result of the output of block 142) provides a "NO" output and block 146 a "YES" output as indicated in FIG. 2E. A "YES" output of block 146 provides an input to block 96 (FIG. 2A) and analysis of LTT LI 29 (after selection of same, FIG. 2A) where LTT LI 29 has an LTN that corresponds to the LTN of LTT LI 28 and where NSTIDF/LS at LTT LI 29 specifies the same test no. as the END test result subtest no. of LTT LI 28. The LTT LSSDDF/LS, LI 29 thereof, specifies the symbol LN and correlates with the CT LN, LI 54 thereof. This CT LI 54 specifies "N" for "NO" under the CT UADF. The LTOIDF at LTT LI 29 specifies "EQS" for equals, therefore block 136 provides a "YES" output and block 138 a "NO" output. At LTT LI 29, the LSSDDF/RS specifies LS and the LNDF/LS identifies the LN of the LSSDDF/LS. With the LTT ASDDF/RS at LTT LI 29, specifying "Y" (yes), then block 140 (FIG. 2D) would provide a "NO" output and the FDF test result. But the FDF result at LTT LI 29 specifies subtest no. 03 test result. This subtest no. 03 is under the NSTIDF/LS LP at LTT LP, LI 30 (after selection of same, FIG. 12E) because LTN at LTT LP, LI 30 under LTNDF corresponds to the LTN of LTT LP LI 29. The LSSDDF/LS at LTT LP, LI 30 indicates the symbol "LN". Consequently, the LNDF/LS at LTT LI 30 corresponds to the CT LN under LNDF at CT LI 55. This CT LI 55 under UADF specifies "N" (no) for an answer. Hence, correlation of LTT LI 30 left and right side DFs in conjunction with the answer of CT UADF at CT LI 55 results in block 140 (FIG. 2D) providing a "NO" output for "F" (false) and LTT FDF at LTT LI 30 specifies "END" as a major test result answer. As indicated in FIG. 2E and with an "END" answer for the FDF at LTT RP, LI 30, block 144 in response to the "NO" output of block 140 via block 145 provides a "YES" output to block 134. Block 134 would then insert in the initial or next LTRT LI entry, e.g., LTRT LI 50, of the LTRT where the LTRT has the same LTN as LTT LP LI 30, the same CDGN at any LI under CDGNDF as the CT CDGNDF and, under the LTRDF, the F answer of the FDF at LTT LI 30 just analized.

Although not shown in Table V for any selected LTT LI having "EQS" under the LTOIDF when the LTT left and right sides are both numbers in conjunction with a CT UADF at a CT LI during CT and LTT analysis as the result of the LN symbol being specified under the LSSDDF/LS, then block 138 would provide a "YES" output to block 150 as shown in FIG. 2D. And as evident from block 150, if the left and right side numbers for LTT and CT LIs are equal, then the TDF of a selected LTT LI just analized with a test result would provide either an "END" output major test result or a subtest number (greater than one) test result. Conversely, when the numbers are not equal after both CT LI and LTT LI analysis together, then block 150 would provide a "NO" output and an "END" major test result or a subtest no. (greater than one) test result under the FDF as a test result for a selected/analized LTT LI. Then, when the analized LTT LI has either a TDF or FDF END test result, the LTRT (having a given CDGN for a CD being formed) via block 134 has a next LI entry (not shown) that specifies under LTRDF "T" for true or "F" for false for TDF or FDF respectively. On the other hand, if the test result is a subtest result, then there is no LTRT LI entry but the SWC goes to the next LTT LI selected for analysis as confirmed by block 148 (FIG. 2E) and block 96 (FIG. 2A).

Now assume during a SWC for forming a CD that block 136 provides a "NO" output to a block 152 (FIG. 2D) as the result of the logic analysis of a given LTT LI selected for analysis where the given LTT LI specifies "GTE" (greater than equals) under the LTT RP, LTOIDF. Reference is made to LTT LI 20 where the LTOIDF at LI 20 specifies "GTE". As indicated by the LTT LSSDDF/LS at LI 20, it specifies the symbol, "LN", the LTT LNDF/LS specifies "FAR CT MUCH" that corresponds to the LN under the LNDF at CT LI 50. Because the LSSDDF/RS at LTT LI 20 specifies LS, the UADF at CT LI 50 indicates a number that is less than the number specified by the ASDDF/RS at LI 20. Then blocks 152 and 154 provide "Yes" outputs, but block 156 provides a "No" output as indicated in FIGS. 2D and as confirmed by block 145 (FIG. 2E). Then the next LTRT LI entry during a SWC, e.g., LTRT LI 52, specifies an "F" answer for the LTRDF at LTRT LI 52 with LTRT LI 52 having the same LTN as LTT LI 20. Then, the "YES" output of block 144 to blocks 134 and 96 causes selection of another LTT LI, if any, for analysis during continuance of a SWC for forming a CD. On the other hand, if the number as specified by a CT UADF at a CT LI (not shown) is greater than the right side number at the ASDDF/RS at the LTT RP, LI 20 then the test result for LTT LI 20 would be the TDF with an END answer and the next LTRT LI entry would be "T" with the LTRT LI next entry having the same LTN as the LTT LI 20. If during analysis, block 152 provides a "YES" output; but, block 154 provides a "NO" output to a block 158 because both LTT left and right side DFs at, e.g. LTT LI 20, are not numbers. Hence, if the LTT left and right sides DFs for a LTT LI in conjunction with a UADF at a CT LI (not shown) provide letters that are either equal (the same) or not equal then block 158 would provide either a "YES" or "NO" output; block 144 a "YES" output; and block 134 "T" or "F" for the next LTRT LI under the LTRT LTRDF respectively.

As with block 136 during a SWC, it is now assumed that block 152 provides a "NO" output to a block 160 as depicted in FIG. 2D; because the LTT LTOIDF for a LTT LI being analized indicates "LTE" (less than equals). With reference to LTT RP, LI 23, its LTOIDF specifies "LTE". LSSDDF/LS at LTT LP, LI 23 specifies the symbol, "LN" and under the LTT LNDF ILS, the LN is "FAR CNT MUCH". With reference to CT LI 50, it specifies the numerical amount of 3000. The LTT LI 23 at its right side and the UADF at CT LI 50 are both numbers though different (the ASDDF/RS at LTT RP, LI 23 being the amount of 1000000). Then the "Yes" output of block 162 is directed to block 164 and its "NO" output for an "END" test result under the FDF at LTT RP, LI 23 via block 145 to block 144 (FIG. 2E). Then block 134 (FIG. 2D) causes the next entry of a new LTRT LI with a "F" answer, e.g., LTRDF at LTRT LI 53 where LTRL LI 53 has the same LTN as LTT LP, LI 23 and prior to selection of another LTT LI, if any, as effected by block 96 (FIG. 10A) during a SWC of the invention. If LTT LI 23 at its left side in conjunction with a UADF at CT LI 50, e.g., are not numbers, then the "NO" output at block 162 is directed to block 166 where either a "YES" or a "NO" output of block 166 occurs when letters, e.g., for both LTT LI 23 right side and CT LI 50 under UADF are either equal or not equal as aforedescribed. Then, a "YES" or "NO" output of block 166 to block 144 occurs and then block 134 causes a next LTRT LI entry (not shown) of "T" or "F" under its LTRDF respectively.

Reference is now made to LTT, LI 5 where the LSSDDF/LS symbol is "LT" which stands for logic test name. The NSTIDF/LS specifies that LTT, LI 5 is subtest no. 03 and the LTOIDF also at LI 5 is "EQS". However, when the SWC for LTT, LI 5 reaches block 136 (FIG. 2D) for logic analysis of LTT at LI 5, block 136 provides a "NO" output because it is assumed that there is no LTN found in Table VI at any LTNDR LI that corresponds to the specified LTN under the LTNDF at LTT LI 5. Thus, the letter logic (in this case) for LTT at LI 5 is insufficient for carrying out logic comparison analysis between letters or numbers as effected by a "YES" output of block 136 as aforedescribed. Similarly, if there was no LTN at any LTRT LI (Table VI) when the TLL LSSDDF/LS is LTN and when the LTT LTIODF/RS is either "GTE" or "LTE", then no comparison would be made by the YES output of block 152 or 160 respectively; and thus, block 152 or 160 would provide a "NO" output during a SWC for forming a CD. With this "NO" output of block 136, blocks 152 and 160 also provide "NO" outputs so that block 168 (FIG. 2E) provides an "N" answer. Accordingly, block 144 provides a "YES" output to block 134 which produces the next LTRT LI, e.g.,LTRT LI 54 (Table VI) and an "N" answer under LTRDF where LTRT LI 54 has the same LTN as LTT LI 5. It is noted here that blocks 136, 138, 140, 142, 145, 150, 152, 154, 156, 158, 160, 162, 164, 166 and 168 all are circumscribed by dotted line 169 that indicates Subroutine B as shown in FIGS. 2D-2E. The purpose of Subroutine B will become more apparent hereinafter.

Reference is also made to the LSSDDF/LS at LTT LI 10 and the LSSDDF/RS thereat both of which specify a symbol "TF" for true/false. For the LTOIDF/LS at LTT LI 10, the symbol is "EQS" and the ASDDF/RS the answer is "True". Accordingly, for block 136, a "YES" output, block 138 a "NO" output and block 140, a "YES" output (be cause of block 113 in FIG. 2B) with TDF at LTT RP LI 10 being an "END" major test result as the result of analysis of LTT LI 10 by itself because of the DF logic therein. Then block 144 would provide a "YES" output to block 134 so that the next LTRT LI, e.g., would be LTRT LI 55 with an answer "T" under its LTRDF and with LTNs at LTT LI 10 (Table V LP) and LTRT LI 55 (Table VI) being the same. Similarly, for LTT LI 10, if the LTOIDF provided an operand of either "GTE" or "LTE", then block 152 or 160 (FIG. 2D) respectively would govern in the analysis in determining a TDF, FDF or NDF test result answer in response to LTT LI 10 DF logic, e. g., TLSDFs and TRSDFs during a SWC for forming a CD.

Although not heretofore mentioned, if a LTT RP LI at TDF, FDF or NDF provides not an END answer; and, if the same LTT LI at TDF or FDF does not provide a subtest no. (greater than one) answer, then block 146 (FIG. 2E) would provide a "NO" output and block 147 terminates the SWC until LTT logic problems are cured. In other words, if a LTT LI at TDF, FDF or NDF does not indicate an END test result or if a LTT LI at TDF or FDF does not indicate a subtest number greater than one, then block 147 governs during a SWC. Thus, without a LTT test result determination for any selected LTT LI for analysis in order to enable selection/nonselection of a GARC, a CD can not be formed during any SWC in accordance with the invention.

In view of the foregoing, it should be evident that all LNs of the LTT LNDF/LS are not shown for the sake of brevity in Table V. Similarly, not all of the LNs under the CT LNDF are shown nor found under the LTT LNDF. However, it is to be understood if all LNs of the LTT LNDF were shown it would include all LNs under the CT LNDF for a CD being formed in response to user input. In carrying out the analysis of any LTT LI during a SWC and depending on whether the LTT LSSDDF/LS specifies LN, LT or TF or any other appropriate symbol (not shown) analysis and test result determination (an END or subtest answer) for any LTT LI is conducted by itself or in conjunction with a CT LI for any LTT LN symbol under the LSSDDF/LS or in conjunction with any LTT LT symbol under the LSSDDF/LS with or without the existence of corresponding LTNs between LTRT and LTT LIs being analized. In other words, if an LTRT LI provides no LTN that corresponds to the LTN of a selected LTT LI being analized during a certain part of the SWC, then after the analysis and test result of the NDF at the LTT LI without the LTRT LI, then the LTRT LI is created (block 134) with an LTN corresponding to the LTN at the selected LTT LI just analized and with the LTRDF at the just created LTRT LI specifying "N" as the test result for the selected/analized LTT LI; For example, LTRT LI 49 is created after LTT LI 15 NDF test results as confirmed by an initial "N" answer under LTRDF at LTRT LI 49.

After all the LTT LIs have been analyzed during a SWC where a major test result for at least one LTT LI occurs as confirmed by a "T", "F" or "N" answer under the LTRDF at a LTRT LI, then block 96 output is "NO" to blocks 95 and 97 (FIG. 2A). At this time during the SWC any LTRT "N" answer at one or more LTR LIs are now analized in conjunction with reanalysis with associated LTT LIs for the purpose of assuring that GARCs being selected for the CD being formed are correct as effected by LTRT "T" answers where LTRT LIs all have a CDGN that is the same as the CT CDGN for the CD being formed. In other words, analysis of all N answers of LTRT 70, after analysis of all LTT LIs as aforedescribed, assures that all N answers remain unchanged or some or all N answers change to either "T" or "F", thereby assuring correct selection of GARCs as will now be described.

Accordingly, block 97 provides an output to block 170 when there are no more LTT LIs to be selected and analized during a SWC and a pass no. 1 is specified and initially provided for analizing all LTRT Ns (unknown) during a SWC as indicated by block 172, see FIG. 2E. Then as confirmed by a block 174 all "N" test results of the LTRT are counted to provide a total number of "N" answers to be analized for pass no. 1. A LTN is selected as indicated by block 176 from the LTRT LTNDF where a LTRT LI is "N" such as ,e.g., LTRT LI 1 thereof (Table VI). At the same time, all LTT LIs are searched until a LTT LI is identified (block 178 FIG. 2F) namely: LTT LI 31 (Table V LP) where the LTT LTN corresponds to the LTRT LTN, LI 1. Since a LTT LTN has been identified and selected, block 182 provides a "Yes" output. If block 182 provides a "NO" output for no LTT LTN being selected at a LTT LI after search of the LTT in relation to a selected LTRT LI having an "N" answer, then block 190 causes the selected LTRT LI N answer to remain unchanged. Moreover, as indicated by block 184, where the blocks of Subroutine A as aforedescribed and as indicated in FIGS. 2B-2C certify that there is sufficient logic in LTT LI 31, then block 186 provides a "NO" output to Subroutine B, block 188. On the other hand, if block 186 provides a "YES" output meaning that LTT LI 31 logic is insufficient because of Subroutine A, then LTRDF at LTRT LI 1 stays an "N" answer as indicated by block 190. As the result of Subroutine B reanalysis of a given LTT LI with a selected LTN (block 182), the given LTT LI with or without analysis of a CT LI as the result of the symbol specified under the LSSDDF/LS for the given LTT LI, the analysis of the given LTT LI will result in a "T", "F" or "N" answer as indicated by the "YES" output of block 194. And if, a "T" or "F" test result, block 190 will update (change) a LTRT LI N answer being analized from "N" to "T" or "F" as the case maybe. But if, the test result if "N" as confirmed by the "YES" output of block 194, then no update (change) is effected by block 190 for an analized LTRT LI N answer during a SWC. Conversely, if there is no "END" test result determination for a reanalized LTRT LI associated with an analized LTRT LI N answer, then block 194 provides a "NO" output to block 198. Because the reanalized LTT LI provided a subtest no. test result (block 198), then another LTT LI is selected (block 178) with the same LTN as LTRT LI N answer being analized and with the same subtest no. under the NSTIDF/LS as the subtest no. result of the reanalized LTT LI until one or more of the selected LTT LIs in being reanalized obtains an END test result for determining whether a given/analized LTRT LI N answer remains either unchanged or changed during a SWC for forming a CD.

For example, LTRT, LI 2 its LTN is D-01. The corresponding LTT LTN is at LTT LP LI 54. Reanalysis of LTT LI 54 by Subroutine A (block 184) would result in no results output by block 114 (FIG. 2B). Then, block 186 provides a "YES" output and block 190 keeps LTRT LI 2 under LTRDF unchanged, still an "N" answer as confirmed by the second "N" in parentheses as shown in Table VI.

Assume during a SWC and a current pass no. that the LTRT LI selected by blocks 191 (FIG. 2G) and 176 (FIG. 2E) is LTRT, LI 49. A corresponding LTN is LTT, LI 13 as effected by block 178, FIG. 2F. As the result of Subroutine A and B analysis, blocks 184 and 188 and with the ASDDF/RS at LTT RP LI 13 being "N" along with the CT UADF being an "N" at CT LI 58 where LTT LI 13 and CT LI 58 have corresponding LNs, then LTT LI 13 provides a TDF subtest (greater than one) answer of 02. Then LTT LI 14 with the same LTN as LTT LI 13 and with subtest 02 under NSTIDF/LS, it provides a subtest 03 answer under the TDF. This test result of LTT LI 14 is because of symbol LT under LSSDDF/LS for LTT LI and because of the LSSDDF/RS being symbol "TF" for LTT LI 14 and the first letter of symbol TF (block 129 of Subroutine A, FIG. 2C governs). Then reanalysis of LTT LI 15 occurs also with LTRT LI 49, because LTT LI 15 has the same LTN as LTT LI 14 and at LTT LI 15, the LTOIDF specifies subtest 03. Then, in accordance with the symbols of the LSSDDF/RS and the ASDDF/RS all at LTT LI 15, the reanalysis of LTT LI 15 together with the LTRT LTRDF "N" answer at LTRT LI 49 results in a major test result of T under the TDF END answer. Accordingly for the current pass no., LTRT LTRDF at LTRT LI 49, the answer is changed to a "T" in parentheses.

Assume that blocks 191 and 176 now select LTRT LI 57 where the LTN is C-02. A corresponding LTN appears at LTT LI 42 where the NSTIDF/LS specifies 01 thereat. As the result of LTT LI 42 reanalysis by Subroutines A and B (blocks 184 and 188, see FIG. 2F), the "YES" output of block 194 provides a TDF ("T") output to block 190 because the first character of symbol "TF" under the LSSDDF/RS governs in accordance with block 129 of Subroutine A (FIG. 2C). Consequently, for current pass no., LTRT LI 57 "N" answer is changed to "T" as indicated by the parentheses about the changed or new answer "T".

Assume that LTRT LTRDF "N" answer at LTRT LI 54 is now analized. Accordingly, LTT LI 3 would be identified and selected for reanalysis because the NSTIDF/LS specifies subtest 01 and the LTT LI 3 LTN corresponds to the LTRT LTN at LTRT LI 54 being analized. CT LI 57 would also be selected because of the LN under CT UADF of FAR SOLICITATION corresponds to the LN under LNDF/LS at LTT LP LI 3. The test result subtest no. 3 under the TDF at LTT LI 3 occurs because of symbols LS and "Y" for TRSDs and of symbol "Y" for CT LI 57 UADF. Then LTT LI 5 is reanalized because it has the same LTN as LTT LI 3 and also it has subtest no. 3 specified under the NSTIDF/LS. The test result would be subtest no. 04 under the TDF at LTT LI 5 because of LSSDDF/RS being "TF" (the first letter "T" of the "TF" symbol would govern by reason of block 129, Subroutine A, FIG. 2C and FALSE symbol at the ASDDDF/RS LTT LI 5, the LT symbol at LSSDDF/LS and the "N" answer at LTRT LTRDF, LI 54. LTT LI 6 which is now reanalized, which has 04 specified under its NSTIDF/LS and same LTN as LTT LI 5 previously reanalized. Reanalysis of LTT LI 6 with LTRT LTRDF "N" answer at LI 54 results in an END result under the TDF. Thus, LTRT LI 54 is changed from "N" to "T" as indicated by the parentheses in Table VI. For the sake of brevity, no other "N" answers are analized in the LTRT, since sufficient analysis is believed to have been done between the LTRT and the LTT or the LTRT, the LTT and the CT as required in accordance with the invention as aforedescribed.

Figure 2F:
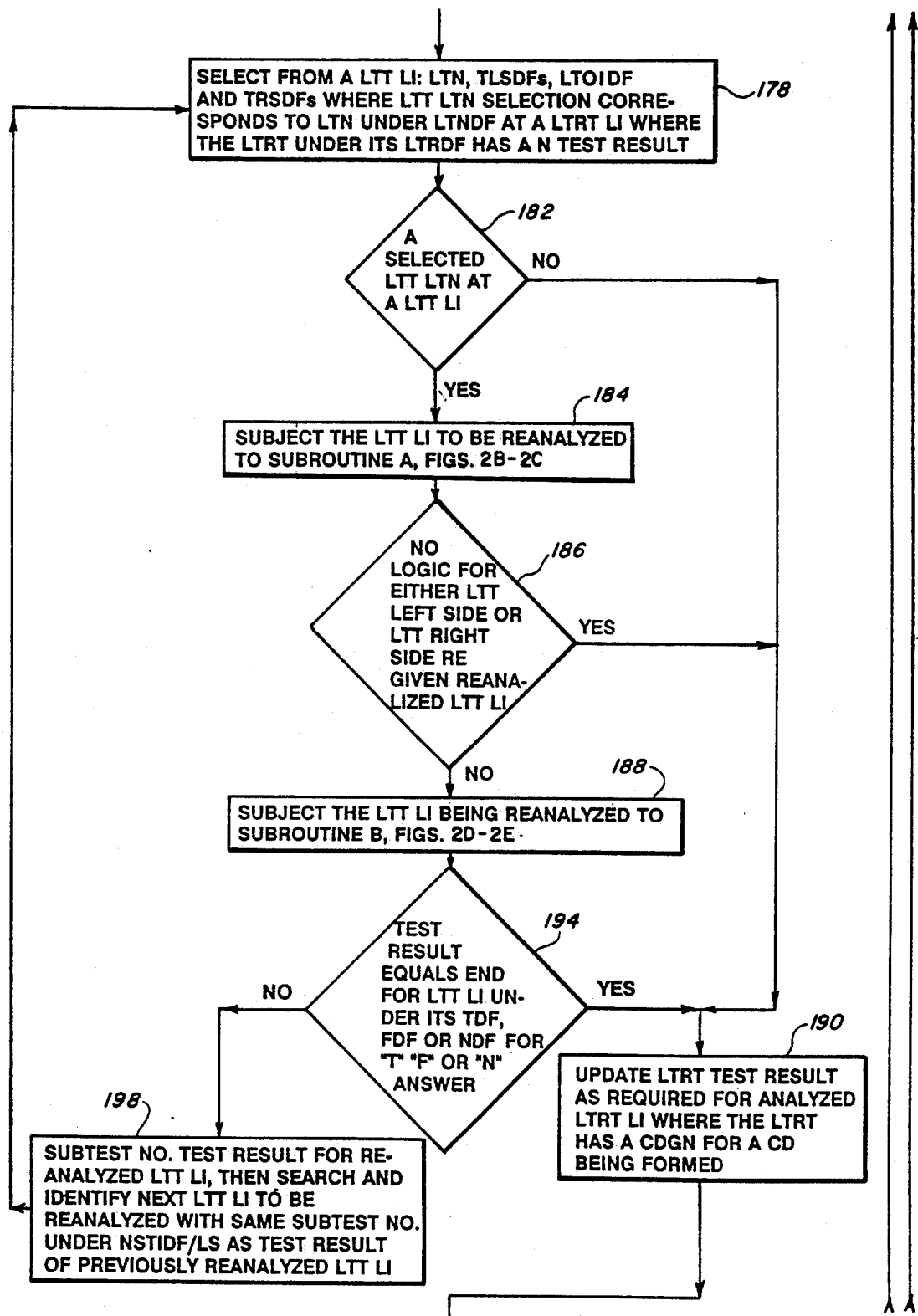
Figure 2G:
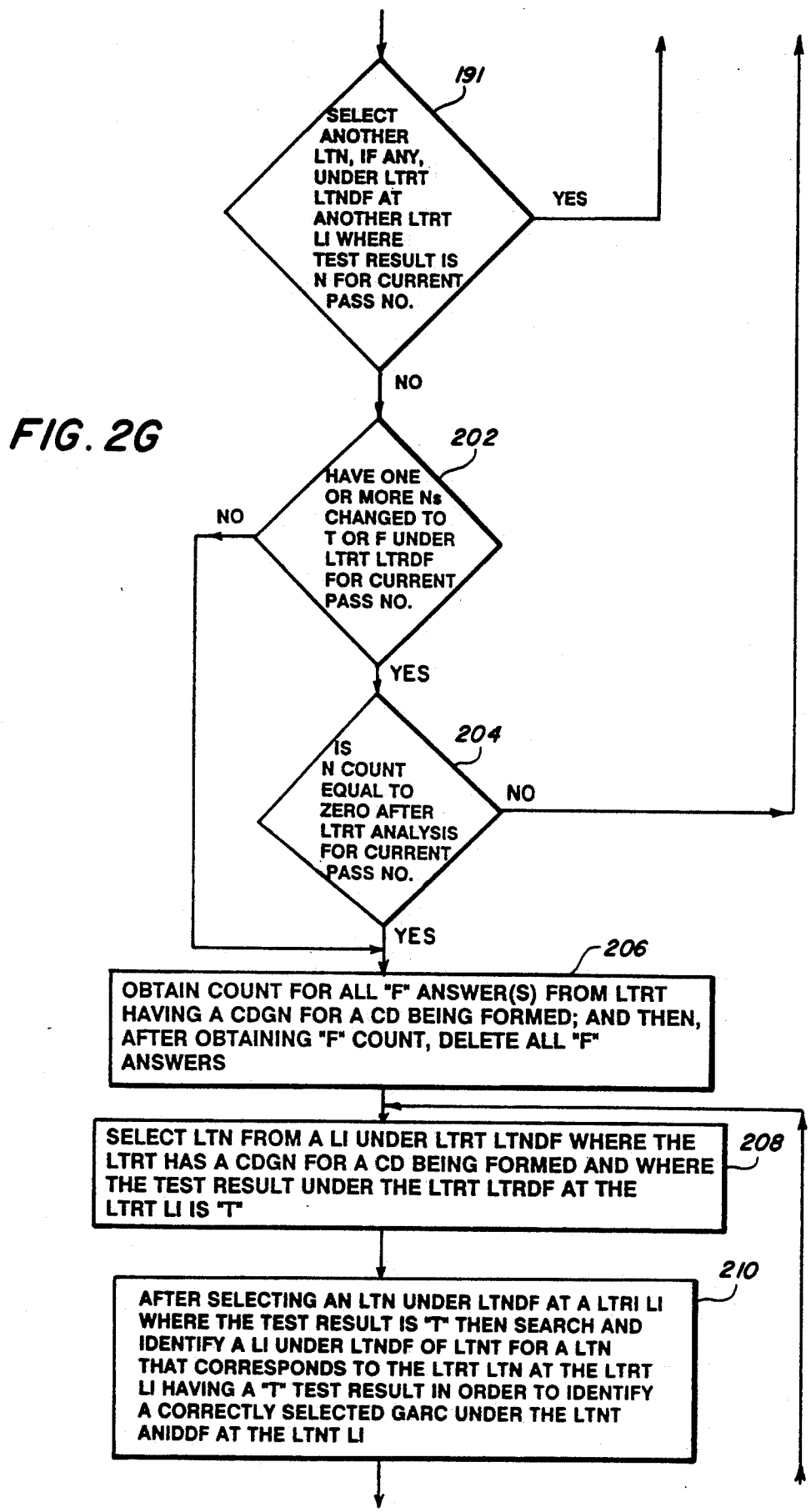
Figure 2H:
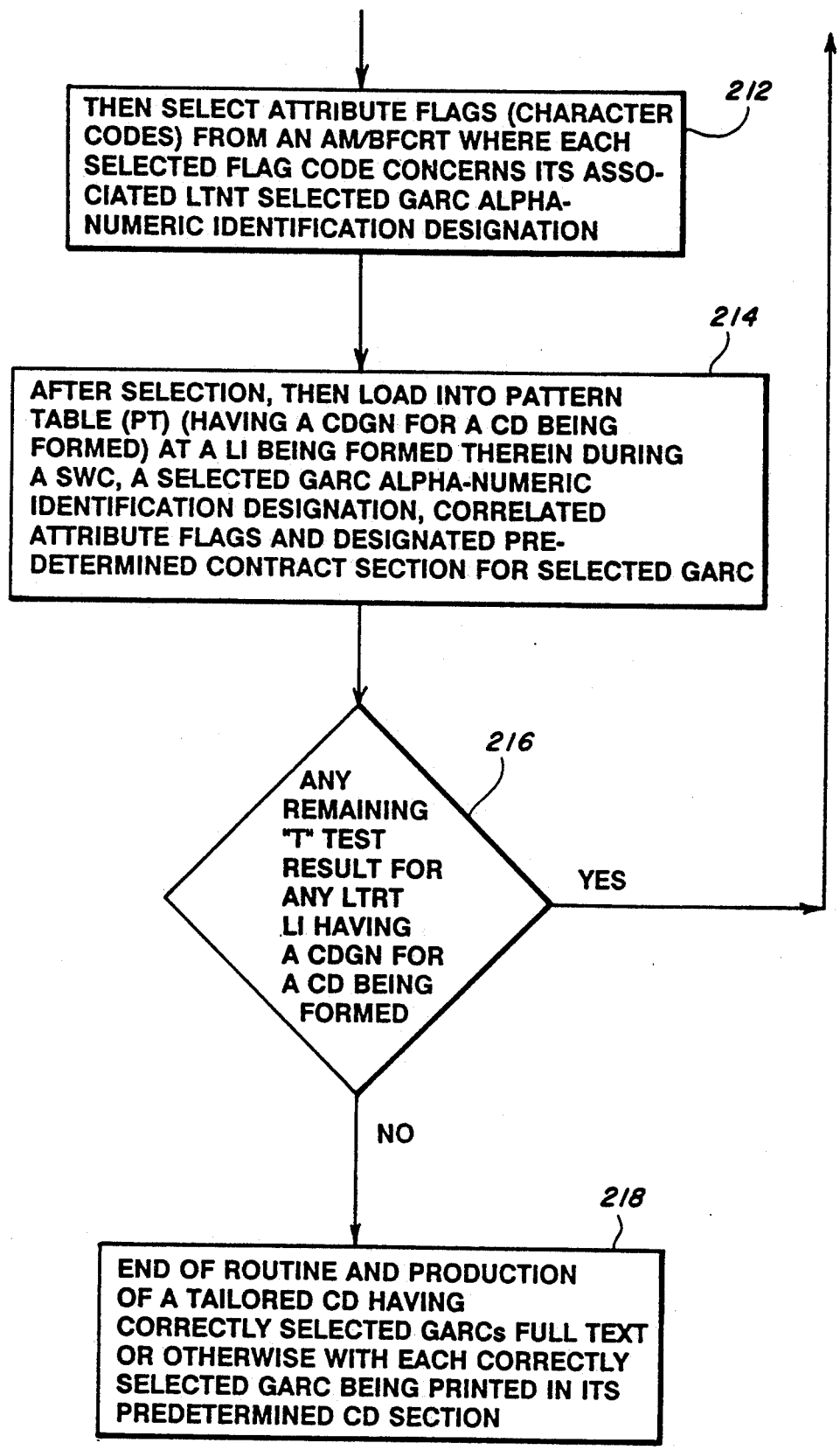

After LTRT analysis at its LI 57, assume that there is no LTRT LIs to analize with an "N" answer. Consequently, block 191 provides a "NO" output and a block 202 provides a "YES" output to a block 204. Assume that the "N" count of the LTRT after LTRT analysis for a current pass number is not zero so that block 204 provides a "NO" output to block 172 for another pass number ,e.g. no. 2, for another analysis of the LTRT as to any "N" answer for any LTRT LI thereof. Then, after the "N" test count for pass no. 2 (block 174), a second analysis of all LTRT LIs with "N" answers occurs between blocks 176 and 191 as aforedescribed and as indicated in FIGS. 2E-2G. Assume after all LTRT LIs have been analized under pass no. 2 that no "Ns" were changed. Consequently, block 202 would provide a "NO" output to a block 206. On the other hand, assume for a given LTRT pass no. and after all LTRT LIs with "N" answers have been analized, block 202 provides a "Yes" output to block 204. Because if the "N" count is then block 204 provides a "YES" output zero. Regardless if block 206 receives a "NO" or "YES" output from block 202 or 204 respectively, an "F" count is obtained after any pass no. for a finally analized LTRT. Then, after this count, all "F" answers are deleted (such deletion is not shown in Table VI for the sake of brevity).

After final analysis of LTRT for a CDGN for a CD being formed all "T" answers of the LTRT are selected. Accordingly, assume that the LTN at LTRT LI 55 is selected, block 208. Then, a corresponding LTN is selected at LTNT LI 59 (Table VII) as effected by block 210. After a byte flag code is selected from the AM/BFCRT (not shown) within the CS data base as the result of the designated ANIDDF at LTNT, LI 59 then the selected GARC along with the predetermined designated contract section for the selected GARC as effected by LTNT LI 59; under its ANIDDF and the WCSDF thereof along with the appropriate byte flag code (not shown) of the AM/BFCRT of the CS data base is entered at PT LI 54 as shown in Table VIII and as effected by blocks 212 and 214. Although the AM/BFCRT is not shown but permanently stored in the CS data base, it is sufficient to note here that it is generally comprised of an ANIDDF and an AM/BFCDF where the LTNT selected ANIDDF for any PT LI is used to search and identify a corresponding GARC under the ANIDDF at a AM/BFCRT LI. Such identification of a corresponding GARC under the ANIDDF at a AM/BFCRT LI enables the byte code under the AM/BFCDF at the given AM/BFCRT LI to be identified as well. Then, the identity of a byte code at a AM/BFCRT LI enables final formation of a PT LI during a SWC. Once the PT is formed for a given CDGN, e.g. CDGN 234, block 216 provides a "NO" output to a block 218 for causing production of a CD with a given CDGN after complying with blocks 20, 22 and 24 in the manner shown in FIG. 1 and as aforedescribed. On the other hand, if PT LI 54 was not the last PT LI because of another LTRT LI having a "T" answer, then block 216 would provide a "YES" output to block 208 for selection of another LTRT LI with a "T" answer, etc.

As evident upon reviewing the PT of Table VIII, each selected byte flag code at a PT LI under the AM/BFCDF is particular thereto. The code for any PT LI is read left to right as viewed in Table VIII. The first or leftward most bit of a byte is either a "0" or "1" as designated for a selected GARC of a PT LI and is to be either full text or incorporated by reference. The second bit of a byte of the code for a PT LI can be "0", "1" or "2". If the number is "0" then a selected GARC is a mandatory clause for a CD being formed; if "1" then a selected GARC is an optional clause; and if "2", then the user at a CS station specified a selected GARC in accordance with the first bit logic of the code. In other words if the first two bits of a byte of the flag code for any PT LI are both zeros "00" or "10" then the selected clause is mandatory full text or mandatory incorporate by reference, e.g., PT LIs 1 and 5 respectively. This is effected during block 18, FIG. 1. If the first two bits of a byte are either "01" or "11", then the clause is optional (full text or incorporate by reference) and because of the code specifying optional, the clause under the ANIDDF at a PT LI is not printed in the CD being formed; e.g., PT LIs 55-56. And if the first two bits of a byte are either "02" or "12", then the clause is user selected for either full text or incorporate by reference; e.g., PT LIs 30 and 29 respectively. As to the third bit of any byte of a code for a PT LI, a designation of "1" means that the selected GARC is a parent clause, e.g., PT LI 10 specifies that a selected clause is mandatory, incorporated by reference and a parent clause. The remaining three bits of any byte of any code of a PT LI are designated "000" at the present time and do not have any intended use by the SW program of the invention as presently configured. Then, with a PT formed during a SWC where a clause at any PT LI is specified by the flag code whether or not it is to be selected for the CD being formed, such occurs despite the prior progressive clause selection analysis of the CT, LTT, LTRT and LTNT as aforedescribed. With the PT formed for a CD, the CD is then produced in accordance with blocks 20, 22 and 24 as depicted in FIG. 1.

In view of the foregoing, it should now be evident that a CT for a CD being formed is produced as result of user data input along with user selection in relation to separate menu lists of categories and questions. Then analysis of any selected LTT LI by itself or in conjunction with any CT LI or LTRT LI as required during a SWC of the invention causes formation of a LTRT having one or more LIs for a CD being formed. After analysis of all "N" answers of the LTRT in conjunction with LTT reanalysis as aforedescribed, the LTRT has a CDGN that corresponds to the CDGN of a CT for a CD being formed. Then the LTRT in conjunction with the LTNT (which is a predetermined permanent part of the CS storage bank along with the LTT and the updatable GARCs) results in the formation of a PT for a CD with one or more correctly selected GARCs along with the appropriate code for each GARC full text or otherwise as the GARCs will appear in their predetermined section of the CD when produced from the PT. Of course, the PT at any LI has a CDGN that corresponds to the CDGN for any LI of the CT and LTRT. e.g. CDGN no. 234 in Tables IV, VI and VIII, so as to assure one or more correctly selected GARCs full text or otherwise (after appropriate logic analysis as aforedescribed) for a CD being formed. Even though one or more GARCs periodically change and one or more new GARCs are generated in response to changes in public policy, the LTT, LTNT and AM/BFCRT can be readily updated without interfering with the use of the invention. Thus, a user is merely required to have sufficient skill for data input entry and selecting optionable menu selections, then permanent data base logic tables along with user data input and user menu selections generate required other logic tables with a CDGN for a CD being formed. Moreover, the CD is formed in a rapid manner not heretofore possible and for all practical purposes without any human error in the correct selection of GARCs for a CD being formed. It is noted here that the logic tables of the SW program are configured with various DFs and logic as aforedescribed. But it is evident, that one or more DFs could be added or changed as required as well as the logic therefor all within the scope of the invention for producing a CD with one or more correctly selected GARCs at one or more predetermined sections therein. Hence, the improved method provides a highly versatile, repeatedly useable and very reliable novel software program for uniquely interrelating various logic tables for analysis and test results. Further, the improved method and the novel program therefor is readily useable on either a single or multiterminal CS without difficulty for forming one or more tailored CDs with correctly selected GARCs therein and with each GARC at its proper predetermined CD section.

In a brief summary of an operative embodiment of the invention, it is evident that a CT is formed for a CD to be produced when a CS user station provides data input as well as its selected questions and categories in response to the SW program as the result of the data input. Then, the LTT begins its analysis by beginning analysis of its first selected LTT LI as by block 100. If the initial or next selected LTT LI is only partially analized because of insufficient logic as detected by blocks 114, 131 or 168, then an "N" test result under NFD at the initial or next selected LTT LI and the initial or next LTRT LI is formed with an "N" answer during this part of a SWC. Then, block 98 provides a 'YES" output prior to selecting another LTT LI, if any, with its correct subtest no. under NSTIDF/LS as effected by block 100, "YES" or "NO" output. Even though a LTT LI may only be partially analized because of its logic insufficiency and even though though this insufficiency may cause improper selection of one or more GARCs in forming a CD, it is to be understood that this logic insuffiiency once detected can readily be corrected by appropriately updating the LTT within the data base of a CS.

After complete LTT analysis during a SWC for forming a CD, then the formed LTRT for a CD will analize all of its "N" answers for one or more pass numbers until the count of all "Ns" either remain unchanged or are zero after analysis for any pass no. During analysis of any given LTRT LI with an "N" answer, the LTT is searched for identifying the correct LTT LI for reanalizing with the given LTRT LI and with or without a CT LI as required and as aforedescribed.

Then with all LTRT "T" answers being certified as true as the result of LTRT N analysis, the LTRT, Table VI in conjunction with the LTNT, Table VII as aforedescribed partially form a PT for a CD being formed. Then, the partially formed PT references and searches the AM/BFCRT (not shown) of the data base for any CD for the purpose of identifying the attribute bits of flag code of any byte that is associated with each selected GARC under the PT ANIDDF so as to designate the multibyte bits of flag code per byte for each PT LI under the PT AM/BFCDF. Then, the specified bits of flag code any PT LI under the AM/BFCDF makes the final determination for selection of a GARC under the PT ANIDDF at any PT LI all for the CD being formed in accordance with the invention.

Obviously many modifications and variations of the present invention are possible in light of the above teachings. It is therefore to be understood that, within the scope of the appended claims, the invention may be practiced otherwise than as specifically described.

What is claimed is:

1. A method of forming a tailored contracting document CD from a menu-driven, option-selection software program of a computer system CS for each software cycle SWC thereof where the program is operatively associated with an interactive storage bank ISB of the CS, the method comprising the steps of:

inputting data at a user station of the CS into the ISB thereof where the inputted data is generally made up of procurement request data PRD, vendor data VD, and contracting line item data CLID, selecting one or more different categories from a list of different categories as stored in the ISB, selectively answering a series of logic questions LQs from a list of a series of LQs as stored in the ISB, forming a multi-line item M/LI multi-data field M/DF configuration table CT for a CD being formed during a SWC, the CT being generally made up of a user answer DF UADF and a logic name DF LNDF, the UADF for any lien item LI thereof having an answer of Y for yes, N for no or a specified numerical amount when the CT is formed and stored in the ISB for a CD being formed as the result of the inputted data along with selected categories and selectively answered LQs, providing a M/LI M/DF logic test table LTT in the ISB for any CD being formed, the LTT being generally made up of a logic test name DF LTNDF; three left side data fields DFs TLSDFs of a numerical sub test identification DF/leftside NSTIDF/LS, a logic selection symbol designated DF/leftside LSSDDF/LS and a logic name DF/LS LNDF/LS; a logic test operand identification DF LTIODF; two right side DFs TRSDFs of a LSSDDF/right side LSSDDF/RS and an answer symbol designated DF/RS ASDDF/RS; and three test result DFs TTRDFs of a TRUE DF TDF, a FALSE DF FDF and an UNKNOWN DF NDF, selecting at least one LTT LI upon formaton of a CT, analizing at least the one selected LTT LI in order to determine the logic symbol specified by the LTT LSSDDF/LS at the selected LTT LI, the operand specified by the LTT LTOIDF thereat and the symbols specified by both the LTT LSSDDF/RS and the LTT ASDDF/RS thereat, determining the logic symbol specified by the LTT LSSDDF/LS at the selected/analiized LTT LI and the operand specified by the LTT LTOIDF thereat and the logic symbols specified by both the LSSDDF/RS and the ASDDF/RS thereat, identifying the logic name LN of the LNDF at the selected/analized LTT LI when the determined logic symbol specified by the LSSDDF/LS is LN for logic name thereat, then identifying a CT LI for a CD being formed having a corresponding LN as the LN of the LNDF of the selected/analized LTT LI as well as identifying the Y, N or numerical answer of the identified CT LI under the UADF thereof and if Y or N providing the test result of a TDF or FDF being designated END for ending the logic analysis at the selected/analized LTT LI so as to enable formation of a M/LI M/DF logic test results table LTRT with a logic test results DF LTRTDF and with a LI of the LTRT having a T answer for true when the identified CT LI under the UADF thereof is Y thereby enabling the formation of a M/LI M/DF pattern table PT where the M/LI M/DF PT is comprised of an attribute multibyte flag code DF AM/BFCDF and an alpha-numeric identified designated DF ANIDDF, the ANIDDF at a given PT LI thereof by reason of it being related to a T answer of the LTRDF at a LTRT LI thereof having a correctly identified Government Agency Regulation Clause GARC as designated in alpha-numeric fashion as taken from an attribute multibyte flag code reference table AM/BFCRT stored in the ISB and the AM/BFCDF at the given PT LI by reason of it being related to the T answer of the LTRT thereat having a correctly identified byte flag code as taken from the AM/BFCRT with the byte flag code at the given PT LI specifying how the correctly selected GARC is to be printed by the CS for the CD being formed.

2. A method as set forth in claim 1, wherein the method further includes the step of initially reviewing a selected LTT LI for logic sufficiency as to a series of two DFs thereof where the series of two DFs are the LNDF/LS and the LSSDDF/LS.

3. A method as set forth in claim 1, wherein the logic symbol under the LSSDDF/LS at the selected LTT LI is LT for logic test name, and wherein the logic test name under the LTNDF thereat is specified.

4. A method as set forth in claim 1, wherein the logic symbol under the LSSDDF/LS at the selected LTT LI is TF for true/false, wherein the logic symbol TF under the LNDF/LS thereat is either true or false.

5. A method as set forth in claim 1, wherein the logic symbol under LSSDDF/RS at the selected LTT LI is LS for logic string.

6. A method as set forth in claim 1, wherein the logic symbol under the LSSDDF/RS at the selected LTT LI is TF for true/false, and wherein the logic symbol TF under the ASDDF/RS thereat as either true or false.

7. A method as set forth in claim 1, wherein the logic symbol under the ASDDF/RS as the selected LTT LI is true, false, Y for yes, N for no, a specified numerical amount or END for an end test result under the TTRDFs thereat.

8. A method as set forth in claim 1, wherein the logic symbol under the LTIODF at the selected LTT LI is EQS for equals, GTE for greater than equals or LTE for less than equals.

9. A method as set forth in claim 8, wherein the method includes the further step of selecting another LTT LI for analysis, if any, during a SWC when the logic symbol or operand under the LTIODF thereat being analized fails to specify EQS, ETE or LTE.

10. A method as set forth in claim 1, wherein the method further includes the step of initially reviewing a selected LTT LI for logic sufficiency at a DF thereof where the DF is the LSSDDF/RS.

11. A method as set forth in claim 1, wherein the method further includes the step of selecting another LTT LI when a TDF or FDF of the selected/analized LTT LI specifies a subtest number greater-than-one.

12. A method asset forth in claim 11, wherein the method further includes the step of terminating selection of a next LTT LI for analysis when the TDF or the FDF of the selected/analized LTT LI fails to provide a subtest number of greater than one.

13. A method of forming a tailored contracting document CD from a menu-driven, option-selection software program of a computer system CS for each software cycle SWC thereof where the program is operatively associated with an interactive storage bank ISB of the CS, the method comprising the steps of:

inputting data at a user station of the CS into the ISB thereof where the inputted data is generally made up of procurement request data PRD, vendor data VD, and contracting line item data CLID, selecting one or more different categories from a list of different categories stored in the ISB, selectively answering a series of logic questions LQs from a list of a series of LQs stored in the ISB, forming a multi-data field M/DF multi-line item L/LI configuration table CT for a CD being formed, the CT being generally made up of a common docket group number DF CDGNDF, a logic name DF LNDF and a user answer data field UADF, the UADF for any line item LI thereof having an answer of Y for yes, N for no or a specified numerical amount when the CT is formed and stored in the ISB for a CD being formed as the result of the inputted data along with selected categories and selectively answered LQs, providing a M/LI M/DF logic test table LTT in the ISB for any CD being formed during a SWC, the LTT being generally made up of a logic test name DF LTNDF; two left side data fields DFs TLSDFs of a logic selection symbol designated DF/left side LSSDDF/LS and a logic name DF/LS LNDF/LS; a logic test operand identification DF LTOIDF; two right side DFs TRSDFs of a LOSSDDF/ right side LSSDDF/RS and and answer symbol designated DF/RS ASDDF/RS; and three test result DFs TTRDFs of a TRUE DF TDF, a FALSE DF FDF and an UNKNOWN DF NDF, selecting at least one LTT LI upon formation of a CT, initially analizing the one selected LTT LI to the extend for determining the logic name of the LNDF/LS when the specified symbol for LSSDDF/LS at the one selected LTT LI is LN for logic name, identifying the LN under the LND/LS at the selected/analized LTT LI, forming a M/LI M/DF logic test results table LTRT for a CD being formed as the result of the one LTT LI being selected/analized, the LTRT being generally made up of a common docket group number DF CDGNDF with the common docket group number CDGN for any LI thereof being the same as any CT CDGN under its CDGNDF, the LTRT being also generally made up of a LTNDF and a logic test results DF LTRDF, searching the CT and identifying the LN under the CT LNDF at a CT LI that corresponds to the identified LN under the LNDF/LS of the selected-/initially analized LTT LI, determining the user answer under the CT UADF for the identified CT LI, further analizing the determined answer of the identified CT LI under the CT UADF with the specified logic under the TRSDFs at the one selected LTT LI along with the operand specified for the LTOIDF thereat, the then determining by reason of both the selected/analized LTT LI and the identified CT LI being further analized the test result of the TDF, FDF or NDF where the test result under TDF, FDF or NDF is designated END for ending logic analysis as true, false or unknown at the selected/analized LTT LI and at the same time placing under the LTRDF for the initial or next LI of the LTRT a true T, false F or unknown N when the test result of the TDF, FDF or NDF is END for ending the logic analysis at the selected/analized LTT LI and when the LTN for logic test name under the LTRT LTNDF at the initial or next LI corresponds to the LTN under the LTNDF at the selected/analized LTT LI.

14. A method of forming a tailored contracting document CD from a menu-driven, option-selection software program of a computer system CS for each software cycle SWC thereof where the program is operatively associated with an interactive storage bank ISB of the CS, the method comprising the steps of:

providing a multi-line item M/LI multi-data field M/DF logic test table LTT in the ISB for any CD being formed, the LTT being generally made up of a logic test name DF LTNDF; at least two left side data fields DFs LTSDFs of a logic selection symbol designated DF/left side LSSDDF/LS and a logic name DF/LS LNDF/LS; a logic test operand identification DF LTOIDF; two right side DFS TRSDFs of a LSSDDF/right side LSSDDF/RS and an answer symbol designated DF/RS ASDDF/RS; and three test result DFS TTRDFs of a TRUE DF TDF, a FALSE DF FDF and an UNKNOWN DF NDF, selecting at least one LTT LI, analizing the one selected LTT LI in order to determine the logic name of the LNDF/LS as well as the logic symbol and the answer symbol of both the LSSDDF/RS and the ASDDF/RS respectively when the logic symbol specified for the LSSDDF/LS at the selected LTT LI being analized is TF for true/false, determining the applicability of the test result of the TDF or FDF when the test result is designated END under either TDF or FDF for ending the logic analysis of the selected/analized LTT LI when the logic symbol is TF for true/false for the LSSDDF/LS thereat, forming a M/LI M/DF logic test results table LTRT, the LTRT being generally made up of a logic test results DF LTRDF, a given LI under the LTRDF having a T for true of F for false answer in response to the END test result of the TDF or FDF of the selected/analized LTT LI so as to enable the formation of a M/LI M/DF pattern table PT when the LTRDF at the given LTRT LI is T for true when the M/LI M/DF PT is comprised of an attribute multibyte flag code DF AM/BFCDF and an alpha-numeric identified designated DF ANIDDF, the identified Government Agency Regulation Clause GARC as designated in alpha-numeric fashion as taken from an attribute multibyte flag code reference table AM/BFCRT stored in the ISB by reason of the ANIDDF being related to and stemming from a T answer of the LTRDF at the given LTRT LI thereof for the CD being formed and the AM/BFCDF at the given PT LI having a correctly identified byte flag code as taken from the AM/BFCRT by reason of the AM/BFCDF being related to and stemming from the T answer of the LTRDF thereat and with the byte flag code at the given PT LI specifying how the correctly selected GARC is to be printed by the CS for the CD being formed.

15. A method of forming a tailored contracting document CD from a menu-driven, option-selection software program of a computer system CS for each software cycle SWC thereof where the program is operatively associated with an interactive storage bank ISB of the CS, the method comprising the steps of:

inputting data at a user station of the CS into the ISB thereof wherein the inputted data is generally made up of procurement request data PRD, vendor data VD, and contracting line item data CLID, selecting one or more different categories from a list of different categories stored in the ISB, selectively answering a series of logic questions LQs from a list of a series of LQs stored in the ISB, forming a multi-line item M/LI configuration table CT for a CD being formed, the CT being generally made up of a user answer data field UADF, the UADF for any line item LI thereof having a user designated answer of Y for yes, N for no or a specified numerical amount when the CT is formed and stored n the ISB as the result of the inputted data along with selected categories and selectively answered LQs, providing a M/LI multi-data field M/DF logic test table LTT in the ISB for any CD being formed, the LTT being generally made up of a logic test name DF LTNDF; three left side data fields DFs LTSDFs of a numerical sub test identification DF/LS LSSDDF/LS and a logic name DF/LS LNDF/LS; a logic test operand identification DF LTOIDF; two right side DFs TRSDFs of a LSSDDF/right side LSSDF/RS and an answer symbol designated DF/RS ASDDF/RS; and three test result DFs TTRDFs of a TRUE DF TDF, a FALSE DF FDF and an UNKNOWN DF NDF where the TDF or FDF has a subtest test number specified therefor, selecting at least one LTT LI in response to the CT being formed, analizing the selected LTT LI in order to determine the logic name of the LNDF/LS when the logic symbol specified for the LTT LSSDDF/LS at the selected LTT LI is LN for logic name, searching the CT and identifying the LN under the CT LNDF at a CT LI that corresponds to the LN under the LNDF/LS for the selected/analized LTT LI, determining the user designated answer under the CT UADF for the identified CT LI, then analizing the determined answer under the UADF along with the specified logic under the TRSDFs at the selected LTT LI as well as the operand specified under the LTOIDF thereat, then determining by reason of both the selected LTT LI and the identified CT LI being analized the test result of the TDF or FDF at the selected/analized LTT LI where the test result for the logic analysis is a subtest test number, searching and identifying for a next LTT LI to be selected and analized where the NSTIDF/LS of the next selected LTT LI specifies the same subtest number as the TDF or FDF specified subtest number for the selected/analized LTT LI and where the LTN for logic test name for both the selected-/analized and the next selected LTT lien items LIs are the same, and further analizing the next selected LTT LI in order to determine that the test result of either the TDF or FDF of the next selected/analized LTT LI is another specified but different subtest number test result therefor so as to cause search and identification for another next elected LTT LI where the logic test names LTNs for the next and the other next selected LTT LIs are the same and where the specified subtest number of the NSTIDF/LS for the other next selected LTT LI is the same as the subtest number under the TDF or FDF of the next selected/analized LTT LI.

16. A method as set forth in claim 15, wherein any subtest number under either TDF or FDF at any selected LTT LI is greater than one.

17. A method as set forth in claim 15, wherein the test result of the TDF, FDF or NDF of the next selected/analized LTT LI is designated END under the TDF, FDF or NDF for ending the logic analysis of the next selected LTT LI as true, false or unknown.

18. A method of forming a contracting document CD from a menu-driven, option-selection software program of a computer system CS for each software cycle SWC thereof where the program is operatively associated with an interactive storage bank ISB of the CS, the method comprising the steps of:

providing in the ISB a M/LI M/DF logic test table LTT for any CD being formed during a CS SWC, each LTT LI being analized when selected for analysis during a SWC, the LTT being generally made up of a logic test name DF LTNDF, a numerical subtest identification DF/left side NSTIDF/LS and three test result DFs TTRDFs of a TRUE DF TDF, a FALSE DF FDF and an UNKNOWN DF NDF, forming a M/LI M/DF logic test results table LTRT for a CD being formed as the result of analysis of one or more LTT line items LIs including test results therefor during a SWC, the LTRT being generally made up of a LTNDF and a logic test results DF LTRDF, each LTRT LI under the LTRDF having an answer of T for true, F for false or N for unknown, assigning a pass number for any analysis of the LTRT when one or more N answers occur under the LTRT LTRDF, initially determining the logic test name LTN under the LTRT LTNDF at a selected LTRT LI with a N answer under the LTRDF that is to be analized upon any pass number being assigned to the LTRT during a SWC and then searching the LTT until a LTN is identified under the LTT LTNDF at a first LTT LI that corresponds to the LTN of the LTRT at the selected LTRT LI along with the first LTT LI having a subtest number of 01 under the NSTIDF/LS, analizing both the LTRT and LTT selected and first LIs with corresponding logic test names LTNs in order to determine the test result of either a TDF, FDF or NDF being designated END for ending the logic analysis at the first LTT LI or a TDF or FDF having a subtest number of greater than one thereat all for both the LTRT and LTT selected and first LIs and the subtest number 01 under the LTT NSTIDF/LS for the first LTT LI;

also analizing a second selected LTT LI when the TDF or FDF at the first and now analized LTT LI provides a subtest number of greater than one test result and when the second LTT LI has an LTN corresponding to the LTRT LTN at the selected LTRT LI, and the second LTT LI also has a subtest number under the NSTIDF/LS corresponding to the same subtest number test result under the TDF or FDF at the first and now analized LTT LI; and then terminating analysis of each selected LTRT LI for an assigned pass number of the LTRT during a SEC after each selected LTRT LI with a N answer has been analyzed in relation to analysis of at least the first LTT LI with an LTN of the first LTT LI corresponding to the LTRT LTN at a selected LTRT LI with a N answer and with the subtest number being 01 under the NSTIDF/LS of the first LTT LI all when the total N answer count is either unchanged or zero after analysis of all selected LTRT LIs with N answers for an assigned pass number as the CD is being formed by being printed by the CS with correctly selected Government Agency Regulation Clauses GARCs during a SWC.

19. A method of forming a contracting document CD from a menu-driven, option-selection software program of a computer system CS for each software cycle SWC thereof where the program is operatively associated with an interactive storage bank ISB, the method comprising the steps of:

inputting data at a user station of the CS into the ISB where the inputted data is generally made up of procurement request data PRD, vendor data VD, and contracting lien item data CLID, selecting one or more different categories from a list of different categories as stored in the ISB, selectively answering a series of logic questions LQs from a list of a series of LQs a stored in the ISB, forming a multi-data field M/DF multi-line item M/LI configuration table CT for a CD being formed during a CS SWC, the CT being generally made up of a logic name DF LNDF, and a user answer DF UADF, the UADF for any line item LI thereof having an answer of Y for yes, N for no or a specified numerical amount when the CT is formed and stored in the ISB as the result of the inputted data, selected categories and selectively answered LQs, providing in the ISB a M/LI M/DF logic test table LTT for any CD being formed during a CS SWC, each LTT LI being analized when selected for analysis during a SWC, the LTT being generally made up of a logic test name DF LTNDF; three left side data fields DFs TLSDFs of a numerical subtest identification DF/leftside NSTIDF/LS, a logic selection symbol designated DF/LS LSSDDF/LS and a logic name DF/LS LNDF/LS; a logic test operand identification DF LTOIDF; two right side DFS TRSDFs of a LSSDDF/right side LSSDDF/RS and an answer symbol designated DF/RS ASDDF/RS; and three test result DFs TFRDFs of TRUE DF TDF, FALSE DF FDF and UNKNOWN DF NDF, also forming a M/LI M/DF logic test results table LTRT for a CD being formed all as the result of one or more LTT line items LIs being analized during a SWC, the LTRT being generally made up of a LTNDF and a logic test results DF LTRDF, each LTRT LI of the LTRDF having an answer of T for true, F for false or N for known, assigning a pass number for each analysis of the LTRT when one or more N answers occur under the LTRT LTRDF, initially determining the logic test name LTN under the LTRT LTNDF at a selected LTRT LI with a N answer that is to be analized, then searching the LTT until a LTN is identified under the LTT LTNDF at a given LTT LI that corresponds to the LTN at the selected LTRT LI where the given LTT LI has a subtest number of 01 under the NSTIDF/LS, analizing at least both LTRT and LTT selected and given LIs with corresponding logic test names LTNs in order to determine a test result of either a TDF, FDF or NDF being designated END for ending at the given LTT LI or a TDF or FDF having a subtest number of greater than one thereat, searching the CT during a SWC until a CT LI is identified having an LN under the Ct LNDF that corresponds to the LN under the LNDF/LS at the given LTT LI in order to determine the answer specified under the UADF for the identified CT LI thereby enabling analysis of the identified CT LI with both the LTT and LTRT given and selected LIs in order to determine a test result either under the TDF, FDF or NDF designated END for ending the logic analysis at the given LTT LI or under the TDF or FDF having a subtest number of greater than one thereat when the logic symbol under the LSSDDF/LS at the given LTT LI is LN for logic name and the logic name is identified under the LNDF/LS thereat, further analyzing at least another given LTT LI when the TDF or FDF at the given LTT LI has a subtest number of greater than one test result and the other given LTT LI has an LTN that corresponds to the LTN at the selected LTRT LI where the subtest number for the NSTIDF/LS at the other given LTT LI corresponds to the subtest number of greater than one test result under the TDF or FDF at the given LTT then terminating analysis of the LTRT with an assigned pass number after each selected LTRT LI with a N answer has been analized with at least one given LTT LI when the total N answer count after analysis of all selected LTRT LIs with N answers for an assigned pass number either remains the same or is zero so that the CD can be printed by the CS with correctly selected GARCs.

20. A method as set forth in claim 19, wherein the logic test operand specified under the LTOIDF, the logic symbol designated under the LSSDDF/RS and the ASDDF/RS all for a given LTT LI being analized contribute to the test result of the selected LTRT LI for a T, F or unchanged N answer when either the LTRT and LTT selected and given LIs are analized together in relation to an assigned pass number or the LTRT and LTT selected and given LIs along with the identified CT LI for analysis with the given LTT LI are all analized in relation to each other and an assigned pass number.

21. A method as set forth in claim 20, wherein the CT and LTRT are each provided with a common docket group number DF CDGNDF with any assigned docket group number for any LI of the CT and LTRT CDGNDFs being the same thereby positively identifying the CD being formed.

22. A method of forming a contracting document CD from a menu-driven, option-selection software program of a computer system CS for each software cycle SWC thereof where the program is operatively associated with an interactive storage bank ISB of the CS, the method comprising the steps of:

provideing in the ISB a multi-data field M/DF multi-line item L/LI logic test name table LTNT for any CD being formed during a SWC, the LTNT being generally made up of a logic test name DF LTNDF and an alpha-numeric identification designated DF ANIDDF for identifying any Government Agency Regulation Clause GARC in the ISB, also providing in the ISB a M/LI M/DF logic test table LTT for any CD being formed during a SWC so that one or more LTT line items LIs can be analized when selected for analysis during a SWC, forming a M/LI M/DF logic test results table LTRT for a CD being formed as the result of one or more selected LTT LIs being analized, the LTRT being generally made up of a LTNDF and a logic test results DF LTRDF where the LTRDF at any line item LI specifies an answer of T for true, F for false or N for unknown as the result of analysis of LTT LIs for forming a CD, also forming a M/LI M/DF pattern table PT, the PT being generally made up of a ANIDDF and an attribute multibyte flag code DF AM/BFCDF, selecting each LI of the LTRT with the selected LTRT LI being selected from the initial LI of the LTRT in sequential fashion until the last LI thereof is selected where each selected LTRT LI from the initial to the last has a T answer, searching and identifying a LTN for logic test name under the LTNT LTNDF at a given LTNT LI that corresponds to the LTRT LTN under the LTNDF at a selected LTRT LI with a T answer under the LTRT LTRDF so as to positively identify a correctly selected GARC under the LTNT ANIDDF at the given LTNT LI until all correctly selected GARCs under the LTNT ANIDDF for a CD being formed are identified in relation to all T answers under the LTRT LTRDF at any selected LTRT LI, and then forming each PT with correctly selected GARCs under the PT ANIDDF as the result of the correctly identified and selected GARC under the LTNT ANIDDF for each selected LTRT LI with a T answer for the CD being printed by the CS during a SWC.

23. A method as set forth in claim 22, wherein the LTRT and PT each have a common docket group number DF CDGNDF where the docket group number of any LI of the CDGNDF for both the LTRT and the PT is the same so as to positively identify the CD being printed by the CS.

24. A method as set forth in claim 22, wherein the LTNT is also made up of a which contract section DF WCSDF for specifying which contract section an identified and correctly selected GARC at a given LTNT LI is to be inserted in the CD being formed and printed by the CS, and wherein the PT is also made up of a WCSDF where the contract section at any PT LI is identified at the same time a correctly selected GARC is identified when the logic test names LTNs of the selected LTRT LI and the given LTNT LI are the same upon formation of the PT at any PT LI during a SEC.

25. A method as set forth in claim 22, wherein the PT is also made up of an attribute multibyte flag code DF AM/BFCDF where the flag code of any AM/BFCDF at any PT LI specifies whether a selected GARC is to be incorporated either by reference or full text in a CD being printed by the CS.

26. A method as set forth in claim 25, wherein in response toe the flag code of the AM/BFCDF at any PT LI, a selected GARC is mandatory either full test or incorporate by reference in a CD being printed by the CS.

27. A method of forming a contracting document CD from a menu-driven, option-selection software program of a computer system CS for each software cycle SWC thereof where the program is operatively associated with an interactive storage bank ISB of the CS, the method comprising the steps of:

inputting data at a user station of the CS into the ISB for forming a CD during a SWC where the inputted data is generally made up of procurement request data, vendor data, and contracting line item data, selecting categories from a list of categories as stored in the ISB, selectively answering a series of logic questions LQs from a list of a series of LQs as stored in the ISB, forming a multi-line item M/LI multi-data field M/DF configuration table CT for a CD being formed during a SWC, the CT being generally made up of a logic name data field LNDF and a user answer data field UADF, the UADF for any line item LI thereof having an answer of Y for yes, N for no or a specified numerical amount when the CT is formed and stored as the result of the inputted data along with the selected categories and the selectively answered LQs, providing in the ISB a M/DF M/LI logic test name table LTNT for any CD being formed, the LTNT being generally made up of a logic test name DF LTNDF and an alpha-numeric identification designated DF ANIDDF for identifying any Government Agency Regulation Clause GARC in the ISB, also providing in the ISB a M/LI M/DF logic test table LTT for any CD being formed, one or more LTT line items LTT LIs being analized when selected for analysis during a SWC, the LTT being generally made up of a logic selection symbol designated DF/left side LSSDDF/LS where the LSSDDF/LS for certain LTT lien items LIs specifies the symbol LN for logic name for the purpose of coordinating with the logic of the CT at a LI thereof having the same LN under its LNDF, also forming a M/LI M/DF logic test results table LTRT as the result of analysis of one or more selected LTT LIs during a CS SWC, the LTRT being generally made up of a LTNDF and a logic test results DF LTRDF where the LTRDF at any line item LI specifies an answer of T for true, F for false or N for unknown as the result of analysis of all selected LTT LIs where each LTT LI of selected LTT LIs can also include analysis with a CT LI when the LSSDDF/LS of any LTT LI specifies the symbol LN all during a SWC for forming and printing the CD by the CS, also forming a M/LI M/DF pattern table PT as a result of analysis of both the formed LTRT and the LTNT, the PT being generally made up of a ANIDDF and an attribute multibyte flag code DF AM/BFCDF, selecting each LI of the LTRT with the selected LTRT LI being selected from either its initial LI or the next LTRT LI all in sequential fashion until the last LI thereof is selected where each selected LTRT LI from the initial to the last thereof has a T answer, searching and identifying a LTN for logic test name under the LTNT LTNDF at a given LTNT LI that corresponds to the LTN under the LTRT LTNDF at a selected LTRT LI with a T answer under the LTRDF thereat so as to positively identify a correctly selected GARC under the LTNT ANIDDF at the given LTNT LI, and then forming each LI of the PT with a correctly selected GARC under the PT ANIDDF as the result of the correctly selected GARC being identified under the LTNT ANIDDF at the given LTNT LI where the correctly selected GARC thereat is related to the selected LTRT LI having a T answer under the LTRT LTRDF as well as the LTN under the LTRT LTNDF corresponding to the LTN of the selected LTNT LI all for forming and printing the CD by the CS during a SWC.

28. A method as set forth in claim 27, wherein the CT, LTRT and PT each have a common docket group number DF CDGNDF where the docket group number of any LI of the CDGNDF for the CT, LTRT and PT is the same so as to positively identify the CD being printed and formed by the CS.

29. A method as set forth in claim 27, wherein the LTNT is also made up of a which contract section DF WCSDF for specifying which contract section a GARC is to be inserted in the CD being formed and printed by the CS, and wherein the PT is also made up of a WCSDDF where the contract section for any PT LI is identified when the logic test names LTNS of the selected LTRT LI and the given LTNT LI are the same.

30. A method as set forth in claim 27, wherein any AM/BFCDF at any PT LI specifies whether a selected GARC is to be incorporated in a CD either full text or incorporation by reference when the selected GARC for a CD is being formed and printed by the CS.

31. A method as set forth in claim 30, wherein in response to the flag code of the AM/BFCDF at any PT LI, a selected GARC is mandatory either full text or incorporate by reference.

32. A method as set forth in claim 30, wherein a selected GARC is either full text or incorporate by reference as the result of at least a flag code of the AM/BFCDF at any PT LI permitting a user at a CS user station to specify either full text or incorporate by reference.

33. A method of forming a contracting document CD from a menu-driven, option-selection software program of a computer system CS for each software cycle SWC thereof where the program is operatively associated with an interactive storage bank ISB of the CS, the method comprising the steps of:

providing in the ISB a M/LI M/DF logic test table LTT for any CD being formed during a SWC, each LTT LI being analized when selected for analysis, the LTT being generally made up of a logic test name DF LTNDF, a numerical subtest identification DF/left side NSTIDF/LS and three test result DFs TTRDFs of a TRUE DF TDF, a FALSE DF FDF and an UNKNOWN DF NDF, forming a M/LI M/DF logic test results table LTRT for a CD being formed as the result of analysis of one or more LTT line items LIs including test results therefor during a CS SWC, the LTRT being generally made up of a LTNDF and a logic test results DF LTRDF, each LTRT LI under the LTRDF having an answer of T for true, F for false or N for unknown, assigning one or more pass numbers for each analysis of the LTRT when one or more N answers occur under the LTRT LTRDF, initially determining the LTN for logic test name under the LTRT LTNDF at a selected LTRT LI with a N answer under the LTRDF that is to be analized upon any pass number being assigned to the LTRT during a SWC and then searching the LTT until a LTN is identified under the LTT LTNDF at a first LTT LI that corresponds to the LTN of the LTRT at the selected LTRT LI along with the first LTT LI having a subtest number of 01 under the NSTIDF/LS, analizing both the LTRT and LTT selected and first LIs with corresponding logic test names LTNs in order to determine a test result of either TDF, FDF or NDF being designated END for ending the logic analysis at the first LTT LI or TDF or FDF having a subtest number of greater than one thereat, and also analizing at least a second LTT LI when the test result of the TDF or FDF at the first and now analized LTT LI provides a subtest number of greater than one and when the second LTT LI has an LTN corresponding to the LTRT LTN at the selected LTRT LI and the second LTT LI also has a subtest number under the NSTIDF/LS corresponding to the same subtest number under the TDF or FDF at the first and now analized LTT LI so as to enable forming and printing by the CS of a CD with correctly selected Government Agency Regulation Clauses GARCs.

* * * * *